United States Patent
Sheppard et al.

(10) Patent No.: US 12,032,535 B2
(45) Date of Patent: Jul. 9, 2024

(54) METHODS AND APPARATUS TO ESTIMATE AUDIENCE SIZES OF MEDIA USING DEDUPLICATION BASED ON MULTIPLE VECTORS OF COUNTS

(71) Applicant: The Nielsen Company (US), LLC, New York, NY (US)

(72) Inventors: Michael R. Sheppard, Holland, MI (US); Jake Ryan Dailey, San Francisco, CA (US); Damien Forthomme, Seattle, WA (US); Jonathan Sullivan, Hurricane, UT (US); Jessica Brinson, Chicago, IL (US); Christie Nicole Summers, Baltimore, MD (US); Diane Morovati Lopez, West Hills, CA (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 112 days.

(21) Appl. No.: 16/917,459

(22) Filed: Jun. 30, 2020

(65) Prior Publication Data
US 2021/0406232 A1    Dec. 30, 2021

(51) Int. Cl.
*G06F 16/215*    (2019.01)
*G06Q 30/0204*    (2023.01)
(Continued)

(52) U.S. Cl.
CPC ....... *G06F 16/215* (2019.01); *G06Q 30/0205* (2013.01); *H04N 21/4667* (2013.01); *G06Q 50/265* (2013.01)

(58) Field of Classification Search
CPC .................................................. G06F 16/215
See application file for complete search history.

(56) References Cited

U.S. PATENT DOCUMENTS

| | | | |
|---|---|---|---|
| 3,903,701 | A | 9/1975 | Gauch et al. |
| 6,108,637 | A | 8/2000 | Blumenau |
| (Continued) | | | |

FOREIGN PATENT DOCUMENTS

| | | |
|---|---|---|
| WO | 2015023589 | 2/2015 |
| WO | 2016086905 | 6/2016 |

OTHER PUBLICATIONS

United States Patent and Trademark Office, "Non-Final Office Action," dated Sep. 17, 2021 in connection with U.S. Appl. No. 16/919,973, 16 pages.

(Continued)

*Primary Examiner* — Maher N Algibhah

(57) ABSTRACT

Disclosed examples to estimate audience sizes of media include a coefficient generator to determine coefficient values for a polynomial based on normalized weighted sums of variances, a normalized weighted sum of covariances, and cardinalities corresponding to a first plurality of vectors of counts from a first database proprietor and a second plurality of vectors of counts from a second database proprietor, a real roots solver to determine a real root value of the polynomial, the real root value indicative of a number of audience members represented in the first plurality of vectors of counts that are also represented in the second plurality of vectors of counts, and an audience size generator to determine the audience size based on the real root value and the cardinalities of the first plurality of vectors of counts and the second plurality of vectors of counts.

28 Claims, 6 Drawing Sheets

(51) Int. Cl.
*H04N 21/466* (2011.01)
*G06Q 50/26* (2012.01)

(56) References Cited

U.S. PATENT DOCUMENTS

| | | |
|---|---|---|
| 6,349,296 B1 | 2/2002 | Broder et al. |
| 6,453,173 B1 | 9/2002 | Reber et al. |
| 8,165,414 B1 | 4/2012 | Yagnik |
| 8,234,151 B1 | 7/2012 | Pickton et al. |
| 8,370,489 B2 | 2/2013 | Mazumdar et al. |
| 8,453,173 B1 | 5/2013 | Anderson et al. |
| 8,930,701 B2 | 1/2015 | Burbank et al. |
| 8,984,547 B2 | 3/2015 | Lambert et al. |
| 9,117,227 B1 | 8/2015 | Agrawal et al. |
| 9,237,138 B2 | 1/2016 | Bosworth et al. |
| 9,575,681 B1 | 2/2017 | Fisher et al. |
| 9,785,666 B2 | 10/2017 | Li et al. |
| 10,248,811 B2 | 4/2019 | Sullivan et al. |
| 11,416,461 B1 | 8/2022 | Sheppard et al. |
| 11,561,942 B1 | 1/2023 | Sheppard et al. |
| 2002/0056087 A1 | 5/2002 | Berezowski et al. |
| 2003/0014399 A1 | 1/2003 | Hansen et al. |
| 2007/0136225 A1 | 6/2007 | Church et al. |
| 2008/0016016 A1* | 1/2008 | Mitarai ............... G06K 9/6269 706/25 |
| 2010/0205430 A1 | 8/2010 | Chiou et al. |
| 2010/0242061 A1 | 9/2010 | Evitan |
| 2012/0072469 A1 | 3/2012 | Perez et al. |
| 2013/0254787 A1 | 9/2013 | Cox et al. |
| 2013/0262181 A1 | 10/2013 | Topchy et al. |
| 2014/0075018 A1 | 3/2014 | Maycotte et al. |
| 2015/0023589 A1 | 1/2015 | Kataoka |
| 2015/0193813 A1 | 7/2015 | Toupet et al. |
| 2015/0248615 A1 | 9/2015 | Parra et al. |
| 2016/0034201 A1 | 2/2016 | Chambliss et al. |
| 2016/0086208 A1 | 3/2016 | Oliver et al. |
| 2016/0134934 A1 | 5/2016 | Jared et al. |
| 2016/0165277 A1 | 6/2016 | Kirillov et al. |
| 2016/0189181 A1 | 6/2016 | McClave et al. |
| 2016/0224866 A1* | 8/2016 | Imade ................... G01R 25/00 |
| 2016/0323616 A1 | 11/2016 | Doe |
| 2016/0379235 A1 | 12/2016 | Mendrisova et al. |
| 2016/0379246 A1 | 12/2016 | Sheppard et al. |
| 2016/0381109 A1* | 12/2016 | Barnett ............. H04N 21/4622 709/231 |
| 2017/0004526 A1 | 1/2017 | Morovati et al. |
| 2017/0011420 A1* | 1/2017 | Sullivan ................ G06N 20/00 |
| 2017/0053306 A1 | 2/2017 | Sissenich et al. |
| 2017/0083580 A1 | 3/2017 | Sheppard et al. |
| 2017/0155956 A1 | 6/2017 | Nagaraja Rao et al. |
| 2017/0257596 A1* | 9/2017 | Murata .................. H04N 7/183 |
| 2018/0176622 A1 | 6/2018 | Sheppard et al. |
| 2018/0332177 A1* | 11/2018 | Shah ................ H04N 21/44226 |
| 2019/0114343 A1 | 4/2019 | Guo et al. |
| 2019/0147461 A1* | 5/2019 | Sheppard ........... G06Q 30/0201 705/14.41 |
| 2019/0220873 A1 | 7/2019 | Sullivan et al. |
| 2021/0004864 A1 | 1/2021 | Daub et al. |
| 2021/0406232 A1 | 12/2021 | Sheppard et al. |
| 2022/0391366 A1 | 12/2022 | Sheppard et al. |

OTHER PUBLICATIONS

United States Patent and Trademark Office, "Non-Final Office Action," dated Feb. 16, 2022 in connection with U.S. Appl. No. 16/919,974, 21 pages.

Ma et al., "Compute N-Way De-Duplicated Reach Using Privacy Safe Vector of Counts," Technical Disclosure Commons, Apr. 15, 2020, (14 pages).

Coffey, "Internet Audience Measurement: A Practitioner's View," Journal of Interactive Advertising, vol. 1, No. 2, pp. 10-17, 2001, 8 pages.

Bhatt et al., "Can Combining Demographics and Biometrics Improve De-duplication Performance?" IEEE Conference on Computer Vision and Pattern Recognition Workshops (CVPRW), 2013, 6 pages.

Metzger et al., "Public Opinion and Policy Initiatives for Online Privacy Protection," Journal of Broadcasting & Electronic Media, Sep. 2003, 25 pages.

United States Patent and Trademark Office, "Notice of Allowance and Fee(s) Due," dated Mar. 16, 2022 in connection with U.S. Appl. No. 16/919,973, 10 pages.

United States Patent and Trademark Office, "Corrected Notice of Allowability," dated Mar. 25, 2022 in connection with U.S. Appl. No. 16/919,973, 2 pages.

Peng et al., "Privacy-centric Cross-publisher Reach and Frequency Estimation Via Vector of Counts," Dec. 2020, 38 pages.

United States Patent and Trademark Office, "Final Office Action," dated Jun. 9, 2022 in connection with U.S. Appl. No. 16/919,974, 23 pages.

United States Patent and Trademark Office, "Notice of Allowance," dated Dec. 2, 2022 in connection with U.S. Appl. No. 16/919,974, 11 pages.

International Searching Authority, "International Search Report," issued in connection with International Application No. PCT/US2014/050551, issued on Nov. 24, 2014, 3 page.

United States Patent and Trademark Office, "Advisory Action," issued in connection with U.S. Appl. No. 16/919,974, dated Sep. 12, 2022, 5 pages.

United States Patent and Trademark Office, "Non-Final Rejection," issued in connection with U.S. Appl. No. 18/157,537, dated Oct. 26, 2023, 30 pages.

* cited by examiner

METHODS AND APPARATUS TO ESTIMATE AUDIENCE SIZES OF MEDIA USING DEDUPLICATION BASED ON MULTIPLE VECTORS OF COUNTS

FIELD OF THE DISCLOSURE

This disclosure relates generally to computer-based audience monitoring and, more particularly, to methods and apparatus to estimate audience sizes of media using deduplication based on multiple vectors of counts.

BACKGROUND

Monitoring accesses to internet-based media can be accomplished using cookies. Cookies are set on computing devices by web servers to identify those computing devices during subsequent visits to those web servers. Two types of cookies include first-party cookies and third-party cookies. A first-party cookie is a cookie set by and accessible by a web server that provides web pages and/or media to a computing device. A third-party cookie is set by a third-party server separate from the web server that provides the web pages and/or media to the computing device. A first-party cookie allows a web server to monitor media accesses, recall user preferences, and/or deliver customized web page experiences to the same user over multiple sessions with the web server. A third-party cookie is typically used solely for collecting media access information to, for example, generate audience metrics information across the Internet and/or to serve Internet-based advertising from ad servers. Thus, while first-party cookies limit media access monitoring capabilities to only first-party web servers that actually serve the media, third-party cookies make it possible for third parties to monitor media accesses without third parties needing to participate in serving media or hosting web pages across the Internet to computing devices.

Figure 1:
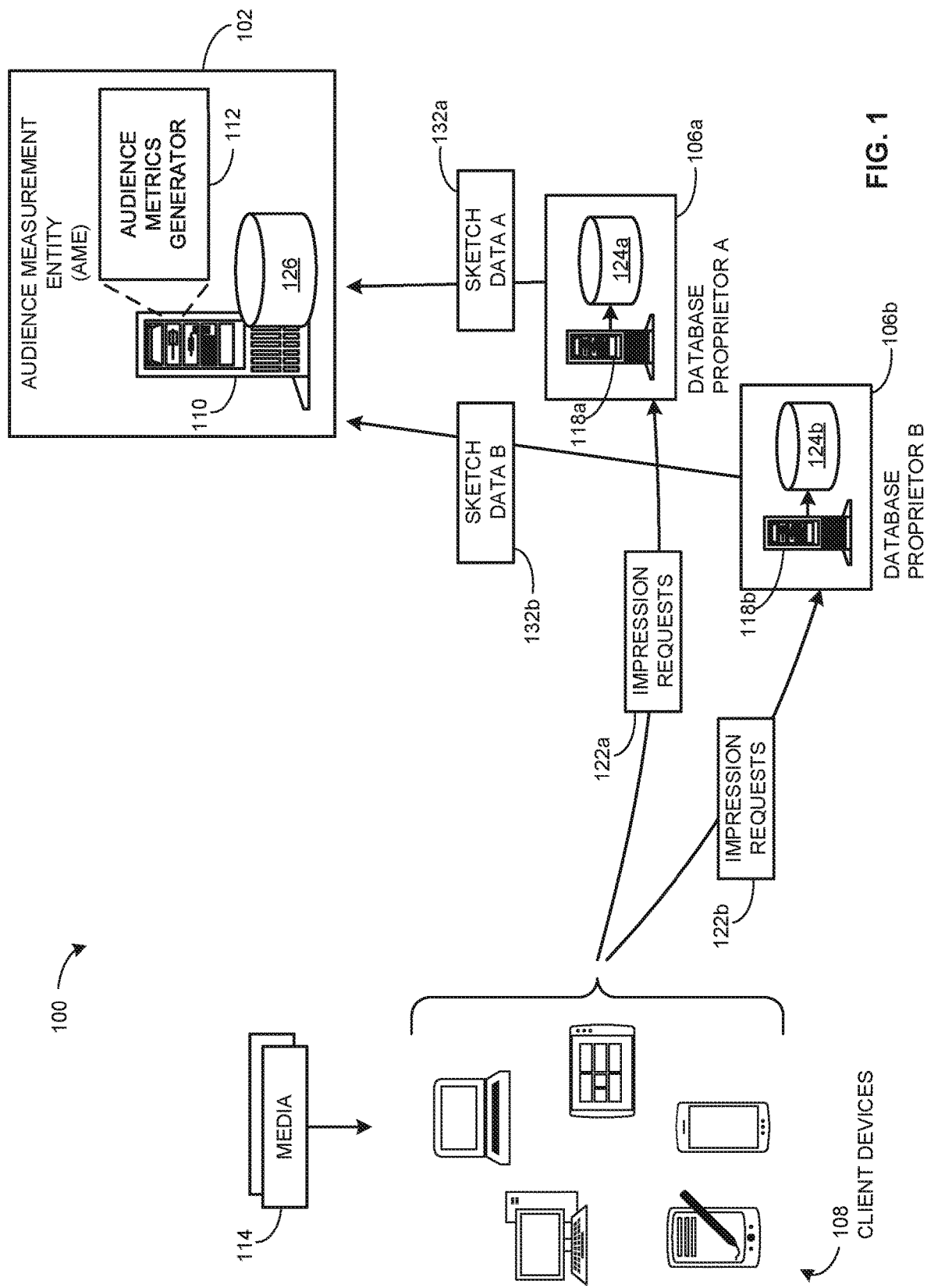
FIG. 1 is an example network-based system for logging impressions of accesses to server-based media.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

There are many database proprietors operating on the Internet. These database proprietors provide services to large numbers of subscribers. In exchange for the provision of services, the subscribers register with the database proprietors and provide personally identifiable information (PII). The types of information collected as part of PII can differ between database proprietors but typically include demographic information (e.g., gender, age, geographic location, income, occupation, etc.), names, email addresses, phone numbers, and/or other information that could be used to identify a particular individual. Examples of database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies (e.g., first-party cookies) and/or other device/user identifiers on the client devices of their subscribers to enable the database proprietors to recognize those subscribers visiting their web sites.

Techniques for deduplication of subscribers between two database proprietors are used to estimate the unique audience size (e.g., number of unique subscribers) between the two database proprietors. The unique audience size is the number of audience members (e.g., subscribers) subscribed to at least one of the two database proprietors and that accessed media served by respective servers (e.g., web servers, media servers, ad servers, etc.) of the database proprietors. That is, an audience member subscribed to both of the database proprietors is only counted once in the unique audience size of the media item. Due to privacy concerns, subscribers of the first database proprietor are known to the first database proprietor, but not to the second database proprietor. Similarly, subscribers of the second database proprietor are known to the second database proprietor, but not to the first database proprietor.

Examples disclosed herein may be used by a monitoring entity to estimate the unique audience size of media served by different database proprietors without compromising the privacies of the subscribers of each database proprietor (e.g., without sharing subscribers' PII outside a database proprietor). In some examples, the monitoring entity can be one of the database proprietors which becomes a third-party entity relative to the other database proprietors. Alternatively, the monitoring entity can be a third-party audience measurement entity (AME) that is a trusted (e.g., neutral) third party for providing accurate usage statistics (e.g., The Nielsen Company, LLC).

The unique audience size can be estimated for a particular subset of subscribers of each database proprietor. For example, each database proprietor can filter its subscribers to create a subset which includes only those subscribers who have accessed a particular media that is of interest for audience metrics analysis. As such, the monitoring entity can deduplicate between the subsets from each database proprietor to estimate the number of unique audience members who have accessed the particular media. Additionally, each database proprietor can further filter the subset based on subscribers that accessed the media and that correspond to a particular demographic such as gender, age, geographic location, income, occupation, etc.

Typically, a monitoring entity is an audience measurement entity (AME) that did not provide the media to the client devices and that is a trusted (e.g., neutral) third party for providing accurate usage statistics (e.g., The Nielsen Company, LLC). Since the AME is a third party, a cookie sent to the AME in an impression request to report the occurrence of the media impression at the client device is a third-party cookie.

Third-party cookie tracking is used by measurement entities to track access to media accessed by client devices from first-party media servers. For example, third-party cookies can be used by third parties to estimate a unique audience size of media served to client devices by multiple web servers. As the use of third-party cookies becomes increasingly restricted by web browsers, the abilities of third parties to reliably monitor Internet-based media accesses using computing-based techniques that do not rely on human intervention becomes challenging. Humans cannot reliably analyze, filter, and confirm the vast quantity of collected media impression data for thousands or millions of media accesses to generate audience metrics information in a reasonable amount of time. To overcome such challenges and limitations of human intervention, examples disclosed herein provide computing-based techniques to overcome the restricted use of third-party cookies for audience metrics generation by deduplicating audience data between two database proprietors based on sketch data provided by each of the database proprietors. Such methods produce an estimate of the unique audience size while preserving privacies of subscribers of those database proprietors.

Techniques for monitoring user accesses to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client device requests the media, both the media and the monitoring instructions are downloaded to the client device. The monitoring instructions are, thus, executed whenever the media is accessed, be it from a server or from a cache. Upon execution, the monitoring instructions cause the client device to send or transmit monitoring information from the client device to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, using first-party cookies set by database proprietors that serve media to client devices of subscribers, impression requests or ping requests cause monitoring data reflecting information about an access to the media to be sent from the client device that downloaded the media to one of the database proprietors in association with a first-party cookie set by the database proprietor to identify the client device and/or a user of the client device. Sending the monitoring data from the client device to the database proprietor is known as an impression request because the type of network communication employed is an HTTP request message that includes information (e.g., media identifier, advertisement campaign identifier, cookie identifier, etc.) about the media impression that occurred for the accessed media. The database proprietor can determine that the client accessed particular media in response to the database proprietor receiving the impression request associated with the particular media. Thus, based on the impression requests, the database proprietor can determine a subset of subscribers that accessed the particular media.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., a database proprietor) in response to an impression request from a user/client device that requested the media. For example, an impression request is a message or network communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or television may be exposed to the same media via multiple database proprietors. For example, a user may receive an advertisement while on a webpage of one database proprietor and receive the same advertisement through a web page of another database proprietor. In such an example, the exposures to the advertisement are logged by both database proprietors, resulting in the same audience member being counted twice as part of an audience of the media across both database proprietors. Multiple logged impressions associated with the same user for the same media item are problematic in determining total reach estimates because a user's multiple accesses to the same media via two or more media sources (e.g., two or more database proprietors) may be counted as two or more unique audience members for that media item. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., database proprietor subscribers) for which a database proprietor stores demographic information or can obtain demographic information. Deduplication is a process that is necessary to adjust cross-source media exposure totals.

As used herein, a unique audience is the number of unique audience members between two database proprietors. Additionally, as used herein, a unique audience is based on audience members distinguishable from one another. That is, a particular audience member exposed to particular media is measured as a single unique audience member regardless of how many times that audience member is exposed to that particular media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base. In some examples disclosed herein, unique audience may also be referred to as unique audience size, audience size, deduplicated audience, and/or deduplicated audience size.

An AME may want to find unique audience sizes across multiple database proprietors. However, the protocols of the Internet make cookies inaccessible outside of the domain (e.g., Internet domain, domain name, etc.) on which they were set. Thus, a first-party cookie set in a media provider domain (e.g., the YouTube.com domain) is accessible to servers in that same domain, but not to servers outside that domain. Therefore, although an AME (e.g., a third party) might find it advantageous to access the first-party cookies set by the database proprietors, the AME is unable to do so. Although third-party cookies (e.g., cookies set by the AME) are useful for third-party measurement entities in many deduplication techniques to track media accesses and to leverage demographic information from third-party database proprietors, use of third-party cookies may be limited or may cease in some or all online markets. That is, use of third-party cookies enables sharing anonymous PII subscriber information across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies.

Examples disclosed herein provide computer-implemented technological solutions for overcoming such challenges by estimating audience sizes between two database proprietors using deduplication based on multiple vectors of counts. In examples disclosed herein, rather than the AME obtaining subscriber information via third-party cookies, the database proprietors are partnered with the AME to send to the AME sketch data that generally represents audience members that accessed media without revealing PII that could be used to identify true identities (e.g., names or aliases) of those audience members. In examples disclosed herein, the subscriber information includes a subset of subscribers from each database proprietor. In examples disclosed herein, each subset of subscribers includes those subscribers from the corresponding database proprietor who have accessed a particular media. Additionally or alternatively, the database proprietors can filter the subscribers represented in the sketch data based on audience demographics (e.g., gender, age, geographic location, income, occupation, etc.). In examples disclosed herein, a database proprietor preserves subscriber privacy by generating the sketch data as multiple vectors of counts before sending the sketch data to the AME for deduplication. In some examples, a first database proprietor sends its sketch data as multiple vectors of counts to a second database proprietor. In such examples, the second database proprietor uses the received sketch data and its own generated sketch data (e.g., multiple vectors of counts) to estimate audience size between the two database proprietors without involvement of the AME.

As used herein, a vector of counts represents an audience of a media item as a distribution of hash values corresponding to each subscriber (e.g., in a subset of subscribers represented by that vector of counts) of a database proprietor. In examples disclosed herein, the vector of counts includes a plurality of bins (e.g., elements). Each bin corresponds to a bin number. The hash value corresponding to a subscriber indicates the bin number for the subscriber. In examples disclosed herein, in response to a hash value indicating a given bin number, the value of the bin corresponding to the given bin number increments by one. As such, the value corresponding to a bin in the vector of counts indicates the number of subscribers assigned to that bin. Each of the database proprietors generates a plurality of vectors of counts to represent a selected audience of a media item under analysis. A vector of counts from a first database proprietor for a particular media item corresponds to a vector of counts from the second database proprietor for the same media item. Two corresponding vectors of counts between the database proprietors is a vector of counts pair. The first database proprietor generates a first vector of the vector of counts pair using a given number of bins and a given hashing algorithm. Similarly, the second database proprietor generates a second vector of the vector of counts pair using the same given number of bins and the same given hashing algorithm.

As used herein, a hash value is a number and/or character representation of an identifier of a subscriber (e.g., a subscriber identifier). In examples disclosed herein, the subscriber identifier uniquely identifies the subscriber to a database proprietor. Example information that may serve as a subscriber identifier includes an email address, a street address, a person's name, a telephone number, a username, a birth date, an Internet Protocol (IP) address, and/or any other information that can be used to uniquely identify a person and/or any combination thereof. In examples disclosed herein, a hashing algorithm converts the subscriber identifier to the corresponding hash value. Typically, the hash value is a binary value, a hexadecimal value, or a decimal value. The hash value transforms to a bin number in the vector of counts.

As used herein, a binary hash (also referred to herein as a bit hash) is a hash function that generates a vector or array of multiple binary outputs (e.g., a string of 0s and/or 1s) from any input (e.g., an audience member's email address) with each element in the array being equally likely (e.g., there is a 50% chance that any given bit in the array will be a 0 and a 50% chance that the bit will be a 1). In some examples, the hash may generate an output that is not in binary form but may be converted to binary form with just 0s and 1s. For example, the hash may generate the hexadecimal output of D447, which would convert to the binary array of 1101010001000111. Further, the hash is defined such that any combination of array values generated by the hash function (e.g., any combination of 0s and 1s or other digits and/or letters for non-binary outputs) is equally likely as any other combination of array values. Further still, the hash is defined such that the same output will always result from the same input. As such, if both database proprietors 106a-b use the same hash function on the same PII (e.g., "johnsmith@email.com"), both database proprietors 106a-b will output the same array of values.

In some examples, to generate the final vector of counts sketch data, the output of the hash function applied to each entry in the database is used to generate an integer value from 1 to n, where n is the number of elements in the vector of counts. The transformation of the output of the hash function to the integer value may be accomplished in any manner that results in a distribution that is uniform (e.g., there is a 1/n probability for any given integer value resulting from the transformation) and consistent (e.g., the same output of the hash function always produces the same integer value). The integer value derived from the output of the hash function applied to a particular data entry is used to identify the particular element within the vector of counts that is to be incremented by 1 to represent the particular data entry. For example, if a first entry in a database (e.g., "johnsmith@email.com") is hashed to the binary array of 11010100, and the total number of elements in the vector of counts is n=16, then only four bits are needed to define any integer value from 1 to 16. Accordingly, in some examples, the four leading bits of 1101 are selected to define a base ten number corresponding to the integer value. That is, the binary value of 1101 corresponds to the decimal number 13 such that the 13th element (out of 16) in the vector of counts is incremented by 1. As subsequent entries in the database are hashed and transformed to an integer value, the corresponding element in the vector of counts is incremented such that each element in the final vector will represent a count of the total number of entries designated to each element in the vector. As a result, the summation of values across all elements in the vector of counts will correspond to the cardinality of the sketch data (e.g., the total number of unique entries in the database represented by the vector of counts). In some examples, multiple different hash functions may be applied to each entry and assigned to a particular element within the vector of counts based on the process outlined above. In such examples, the summation of values across all elements in the vector of counts will corresponding to the cardinality of the sketch data multiplied by the number of hash functions used. For purposes of explanation, examples described below assume only one hash function is used.

Deduplicating based on multiple vectors of counts, as disclosed herein, involves determining a first variance for the first vectors of counts of the first database proprietor, determining a second variance for the second vectors of counts of the second database proprietor, and determining a covariance for the first vectors of counts and the second vectors of counts. In addition, examples disclosed herein determine an estimate of the deduplicated value by determining the solution to a polynomial based on the first variance, the second variance, and the covariance. The deduplicated value is indicative of the audience size for an item of media (e.g., the unique number of people that accessed a particular media item).

Although examples disclosed herein are described in association with audience metrics related to media impressions, examples disclosed herein may be similarly used for other applications to deduplicate between any two data sets while preserving privacy. The data sets themselves need not be audiences or email addresses. They could be, for example, bank accounts, lists of purchased items, store visits, traffic patterns, etc. The data sets could be represented as lists of numbers or any other information.

FIG. 1 shows an example operating environment 100 that includes an example audience measurement entity (AME) 102, an example database proprietor A 106a, an example database proprietor B 106b, and example client devices 108. The example AME 102 includes an example AME computer 110 that implements an example audience metrics generator 112 to determine audience sizes based on sketch data generated by the database proprietors 106a,b. In some examples, the example audience metrics generator 112 can be implemented by at least one of the database proprietors 106a,b instead of the example AME 102. In the illustrated example of FIG. 1, the client devices 108 may be stationary or portable computers, handheld computing devices, smart phones, Internet appliances, and/or any other type of device that may be connected to the Internet and capable of accessing and/or presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience, unique audience size, deduplicated audience, and/or deduplicated audience size.

As used herein, a media impression is defined as an occurrence of access and/or exposure to media 114 (e.g., an advertisement, a movie, a movie trailer, a song, a web page banner, etc.). Examples disclosed herein may be used to monitor for media impressions of any one or more media types (e.g., video, audio, a web page, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form in a network.

In the illustrated example of FIG. 1, content providers and/or advertisers distribute the media 114 via the Internet to users that access websites and/or online television services (e.g., web-based TV, Internet protocol TV (IPTV), etc.). In some examples, the media 114 is served by media servers of the same internet domains as the database proprietors 106a,b. For example, the database proprietors 106a,b include corresponding database proprietor servers 118a,b that can serve media 114 to their corresponding subscribers via the client devices 108. Examples disclosed herein can be used to generate audience metrics data that measures audience sizes of media served by different ones of the database proprietors 106a,b. For example, the database proprietors 106a,b may use such audience metrics data to promote their online media serving services (e.g., ad server services, media server services, web server services, etc.) to prospective clients. By showing audience metrics data indicative of audience sizes drawn by corresponding ones of the database proprietors 106a,b, the database proprietors 106a,b can sell their media serving services to customers interested in delivering online media to users.

The media 114 is then presented via the client devices 108. When the media 114 is accessed by the client devices 108, the client devices 108 send impression requests 122a,b to the database proprietor servers 118a,b to inform the database proprietor servers 118a,b of the media accesses. In this manner, the database proprietor servers 118a,b can log media impressions in impression records of corresponding database proprietor audience metrics databases 124a,b. When a database proprietor server 118a,b serves the media 114, the impression request 122a,b includes a first-party cookie set by that database proprietor server 118a,b so that the database proprietor server 118a,b can log an impression for the media 114 without using a third-party cookie. In some examples, the database proprietor servers 118a,b may additionally or alternatively log impressions based on requests for media 114 from the client devices 108. For example, when a user of client device 108 provides a URL or selects an item of media for viewing, the client device 108 sends an HTTP request to a database proprietor server 118a,b that includes the first-party cookie and an identifier of the requested media. In response, the database proprietor server 118a,b serves the requested media to that client device 108 and logs an impression of the media as attributable to the client device 108. In the illustrated example of FIG. 1, the database proprietors 106a,b log demographic impressions corresponding to accesses by the client devices 108 to the media 114. Demographic impressions are impressions logged in association with demographic information (e.g., PII) collected by the database proprietors 106a,b from registered subscribers of their services. Examples disclosed herein are based on audience data from impressions collected by the database proprietors 106a,b.

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and/or episode number. When the example media 114 includes advertisements, such advertisements may be content and/or advertisements. The advertisements may be individual, standalone ads and/or may be part of one or more ad campaigns. The ads of the illustrated example are encoded with identification codes (e.g., data) that identify the associated ad campaign (e.g., a campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, the media 114 of the illustrated example is tagged or encoded to include monitoring or tag instructions, which are computer-executable monitoring instructions (e.g., Java, java script, or any other computer language or script) that are executed by web browsers that access the media 114 via, for example, the Internet. Execution of the monitoring instructions causes the web browser to send the impression requests 122a,b (e.g., also referred to as tag requests) to the database proprietor A 106a, and/or the database proprietor B 106b. As used herein, tag requests 122a,b are used by the client devices 108 to report occurrences of media impressions caused by the client devices accessing the media 114. In the illustrated example, the tag requests 122a,b include user-identifying information that the database proprietors 106a,b can use to identify the subscriber that accessed the media 114. For example, when a subscriber of the database proprietor 106a logs into a server of the database proprietor 106a via a client device 108, the database proprietor 106a sets a database proprietor cookie (e.g., a first-party cookie) on the client device 108 and maps that cookie to the subscriber's identity/account information at the database proprietor server 118a. In examples disclosed herein, subscriber identity and/or subscriber account information includes personally identifiable information (PII) such as full name, street address, residence city and state, telephone numbers, email addresses, ages, dates of birth, social security numbers, demographic information, and/or any other personal information provided by subscribers in exchange for services from the database proprietors 106a,b. By having such PII information mapped to database proprietor cookies, the database proprietor 106a can subsequently identify the subscriber based on the database proprietor cookie to determine when that user accessed different media 114 and to log an impression in association with demographics and/or other PII information of that user. In the illustrated example of FIG. 1, the impression requests 122a-b (e.g., tag requests) include database proprietor cookies of the client devices 108 to inform the database proprietors 106a,b of the particular subscribers that accessed the media 114.

The tag requests 122a,b may be implemented using HTTP requests. However, whereas HTTP requests are network communications that traditionally identify web pages or other resources to be downloaded, the tag requests 122a,b of the illustrated example are network communications that include audience measurement information (e.g., ad campaign identification, content identifier, and/or user identification information) as their payloads. That is, the example tag requests 122a,b are dummy HTTP requests that do not return web pages or resources. The server (e.g., the database proprietor servers 118a,b) to which the tag requests 122a,b are directed is programmed to log occurrences of impressions reported by the tag requests 122a,b in, for example, impression records. Further examples of monitoring instructions (e.g., beacon instructions) and uses thereof to collect impression data are disclosed in U.S. Pat. No. 8,370,489 entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and causes the client device 108 to send one or more of the impression requests 122a,b to report the access to the media 114. In such examples, the data collector can obtain user identifiers and/or device identifiers stored in the client devices 108 and send them in the impression requests 122a,b to enable the database proprietors 106a,b to log impressions. Further examples of using a collector in client devices to collect impression data are disclosed in U.S. Pat. No. 8,930,701 entitled "Methods and Apparatus to Collect Distributed User Information for Media Impressions and Search Terms," and in U.S. Pat. No. 9,237,138 entitled "Methods and Apparatus to Collect Distributed User Information for Media Impressions and Search Terms," both of which are hereby incorporated herein by reference in their entireties.

In the illustrated example, the database proprietors 106a,b would like to collaborate with the AME 102 so that the AME 102 can operate as an independent party that measures and/or verifies audience measurement information pertaining to the media 114 accessed by the subscribers of the database proprietors 106a,b. However, the database proprietors 106a,b desire to do so while protecting the privacies of their subscribers by not sharing or revealing subscriber identities, subscriber information, and/or any other subscriber PII information to outside parties. In examples disclosed herein, to share impression data with the AME 102 without revealing subscriber identities, subscriber information, and/or any other subscriber PII information, the database proprietors 106a,b process their collected impression data to generate corresponding sketch data 132a-b as described below in connection with FIG. 2.

As used herein, sketch data is an arrangement of data for use in massive data analyses. For example, operations and/or queries that are specified with respect to the explicit and/or very large subsets of data can be processed much faster from the smaller sketches representing the actual data than if processed based on the actual, larger data space. This enables processing each observed item of data (e.g., each logged media impression and/or audience member) quickly in order to create a summary of the current state of the actual data. In some examples, the time to process a query using sketch data can be orders of magnitude less than the time to process a query using the actual data.

Figure 2:
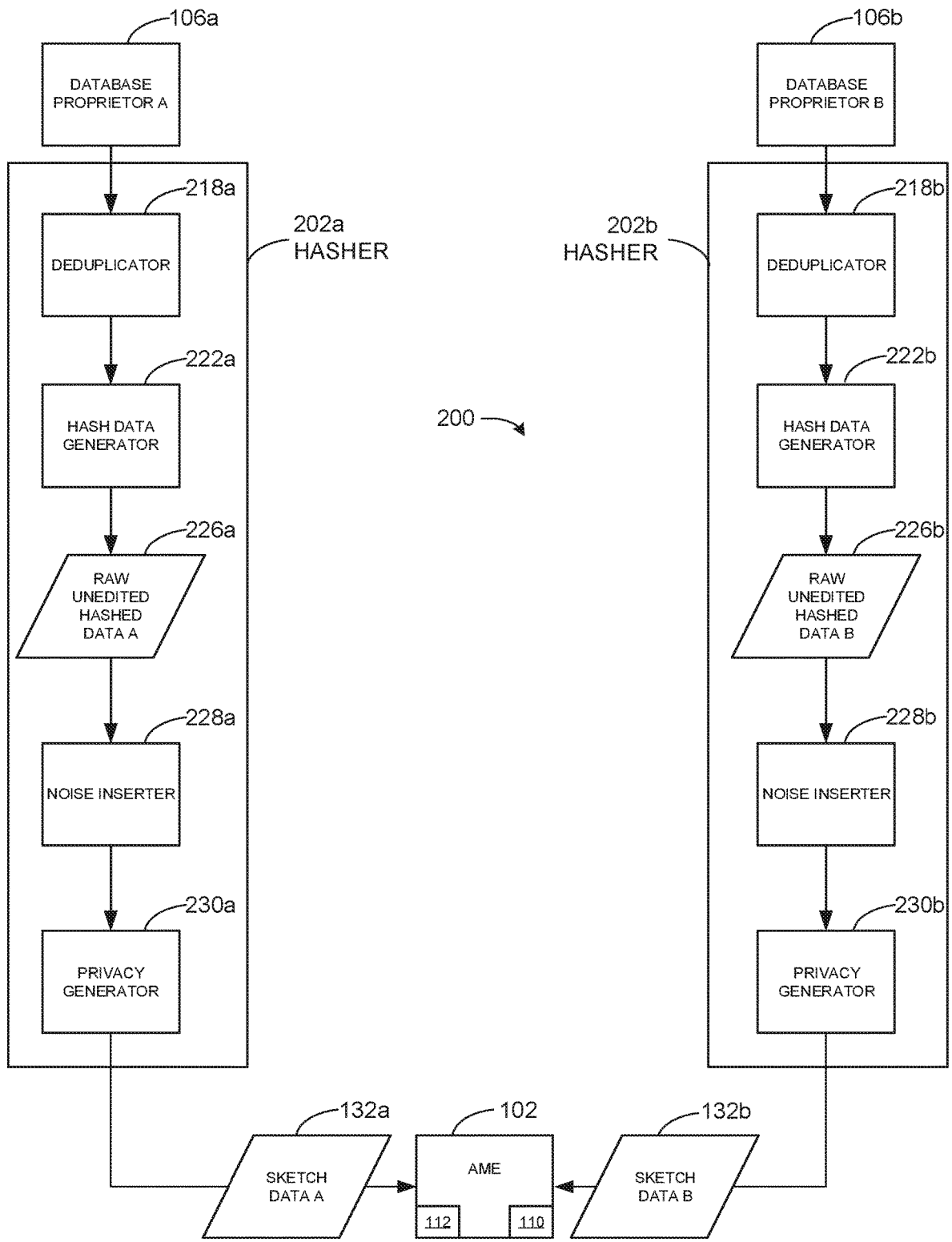
FIG. 2 is a sketch data generation system to facilitate database proprietors of FIG. 1 to provide sketch data to the audience measurement entity of FIG. 1 for use in estimating audience sizes of media.

FIG. 2 is an example sketch data generation process 200 implemented by the database proprietors 106a,b of FIG. 1 to provide the sketch data 132a,b (FIG. 1) to the AME computer 110 (FIG. 1) for use in estimating audience sizes of media (e.g., the media 114 of FIG. 1). In the illustrated example, the database proprietors 106a,b are in communication with the AME computer 110 to cooperate with the AME 102 to determine unique audience sizes for different media items accessed via the Internet on client devices (e.g., the client devices 108 of FIG. 1) by user subscribers of the database proprietors 106a,b. For example, the database proprietors 106a,b log impressions reported by client devices as described above in connection with FIG. 1 and leverage this data so that the AME 102 can generate audience metrics data without revealing user identities or personally identifiable information (PII) of the subscribers of the database proprietors 106a,b. To protect privacy of user data while leveraging a separate AME 102 to determine unique audience sizes of different media items, the database proprietors 106a,b generate the sketch data 132a,b (e.g., subscriber data) to provide to the AME computer 110 as described below in connection with FIG. 2.

In the example of FIG. 2, each of the database proprietors 106a,b includes a corresponding example hasher 202a,b to produce the sketch data 132a,b for delivery to the AME 102. In the example of FIG. 2, the database proprietors 106a,b agree on particular media and audience demographics for which to generate audience metrics. The example database proprietors 106a,b filter their respective audience data (e.g., represented in the logged impressions) to only include audience members having accessed the particular media and belonging to the particular demographics. The example hashers 202a,b include deduplicators 218a,b that deduplicate audience data to generate unique audience data relative to each database proprietor 106a,b. The database proprietors 106a,b include hash data generators 222a,b that use an agreed upon method of hashing and summarizing the deduplicated, unique audience data. In examples disclosed herein, the agreed upon type of hashing and summary type is vector of counts sketch data. In examples disclosed herein, each of the database proprietors 106a,b produces sketch data for multiple vectors of counts. In some examples, one of the database proprietors 106a,b generates vectors of counts of different lengths relative to the vectors of counts generated by the other database proprietor 106a,b. In the example of FIG. 2, the hash data generators 202a,b perform the agreed upon hashing and summarization to generate corresponding raw unedited hashed data 226a,b. In the illustrated example of FIG. 2, the database proprietors 106a,b may also elect to insert noise into the raw unedited hashed data 226a,b using noise inserters 228a,b to produce data with a secondary level of privacy protection for subscribers' PII data. However, in some examples, the database proprietors 106a,b may elect not to insert noise. The example hash data generators 202a,b also include privacy generators 230a,b to zero-mean the raw data 226a,b (with noise or without noise) to generate the sketch data 132a,b. In some examples, the database proprietors 106a,b may elect not to zero-mean the raw data 226a,b. In such examples, the sketch data 132a,b is provided to the AME 102 as raw data.

Figure 3:
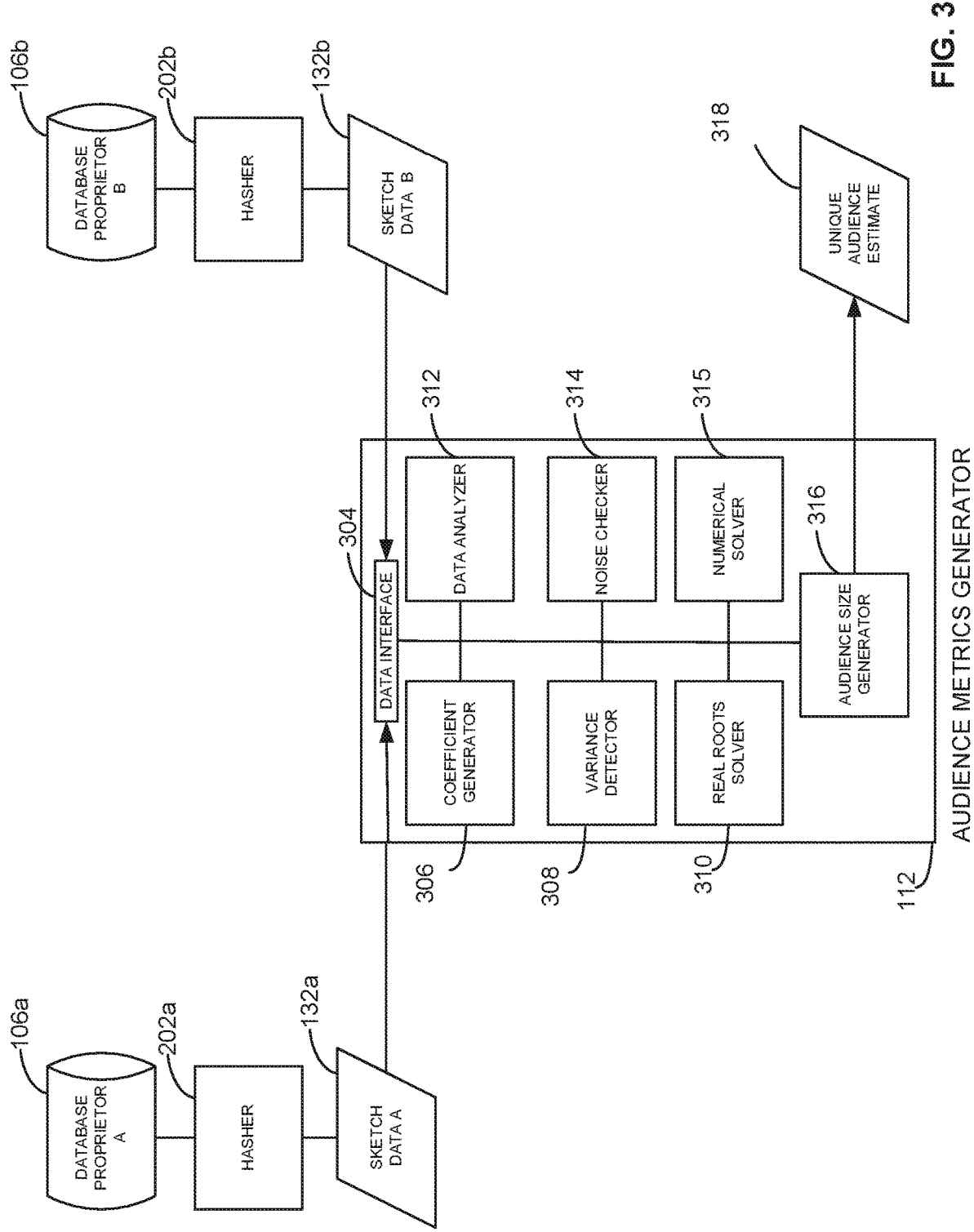
FIG. 3 is a block diagram of an example audience metrics generator of FIGS. 1 and 2 to estimate audience sizes of media using deduplication based on multiple vectors of counts in accordance with teachings of this disclosure.

FIG. 3 illustrates the example audience metrics generator 112 of FIGS. 1 and 2 to estimate unique audience sizes of media 114 (FIG. 1) using deduplication based on sketch data 132a,b that includes multiple vectors of counts representative of the subscribers of the database proprietors 106a,b. In the illustrated example, the audience metrics generator 112 receives the sketch data A 132a from the database proprietor A 106a, and receives the sketch data B 132b from the database proprietor B 106b. To access and process the sketch data 132a,b, the example audience metrics generator 112 includes an example data interface 304, an example coefficient generator 306, an example variance detector 308, an example real roots solver 310, an example data analyzer 312, an example noise detector 314, an example numerical solver 315, and an example audience size generator 316.

In the illustrated example of FIG. 3, the audience metrics generator 112 is provided with the data interface 304 to access the sketch data 132a,b. For example, the data interface 304 may be a network interface to access the sketch data 132a,b via network communications from servers of the database proprietors 106a,b. Alternatively, the example data interface 304 may be a memory/storage interface to access the sketch data 132a,b from memory and/or data storage devices.

In examples disclosed herein, each database proprietor 106a,b provides multiple vectors of counts (e.g., two or more vectors of counts). Also in examples disclosed herein, a pair of vectors of counts refers to a first vector of counts (e.g., $V_A^{(1)}$) from one database proprietor 106a,b and a second vector of counts (e.g., $V_B^{(1)}$) from the other one of the database proprietors 106a,b. Since multiple vectors of counts are provided by each database proprietor 106a,b, there are multiple pairs of vectors of counts (e.g., $V_A^{(1)}$ and $V_B^{(1)}$; $V_A^{(2)}$ and $V_B^{(2)}$; etc.), In addition, bin count (e.g., number of bins in a vector of counts, vector of counts length) may be different between pairs of vectors of counts. For example, one pair may have vectors of counts of five bins in length (e.g., $V_A^{(1)}$, $V_B^{(1)}$={bin 1, bin 2, bin 3, bin 4, bin 5}) and another pair may have vectors of counts of 10 bins in length (e.g., $V_A^{(2)}$, $V_B^{(2)}$={bin 1, bin 2, bin 3, bin 4, bin 5, bin 6, bin 7, bin 8, bin 9, bin 10}). In examples disclosed herein, the database proprietors 106a,b select the bin count for each pair of vectors of counts. A high bin count increases the accuracy of estimations of audience size, but reduces subscriber privacy. Alternatively, a low bin count reduces the accuracy of estimations of audience size, but increases subscriber privacy. As such, the database proprietors 106a,b select the appropriate bin counts based on the size of the subscriber base of each database proprietor 106a,b, a target accuracy for audience size estimation, and/or a target level or strength of privacy for their subscribers. In some examples, the database proprietors 106a,b can split a single vector of counts (e.g., a vector of counts with a bin count of 1000) into multiple vectors of counts (e.g., 10 vectors of counts with bin counts of 100) to increase subscriber privacy.

In the illustrated example of FIG. 3, the audience metrics generator 112 is provided with the data analyzer 312 to analyze the sketch data 132a,b from the data interface 304. The example data analyzer 312 first checks if the sketch data 132a,b is raw data and/or zero-meaned data. In some examples, the database proprietor A 106a may provide raw data and the database proprietor B 106b may provide zero-meaned data. The audience metrics generator 112 can process the sketch data 132a,b regardless of whether it is provided as raw data or as zero-meaned data. The example data analyzer 312 has multiple functions including, for example: (a) determining if each pair of vectors of counts in the incoming sketch data 132a,b from the data interface 304 is raw data and/or zero-meaned data, (b) deciding if the data analyzer 312 should zero-mean the raw data in each pair of vectors of counts, (c) passing the sketch data 132a,b to the example variance detector 308, and (d) alerting the example variance detector 308 which set of equations to use, as discussed below. For example, if both sets of the sketch data 132a,b are provided as raw data, the data analyzer 312 can zero-mean the sketch data 132a,b before proceeding with the calculations.

In the illustrated example, depending on whether the sketch data 132a,b is provided as raw data or zero-meaned data, the variance detector 308 can find the variance of the sketch data 132a,b using zero-meaned data equations for each pair of vectors of counts. In the illustrated example, Equations 1 through 10 below are used for zero-meaned data. In the illustrated example, in response to the data analyzer 312 determining that the sketch data 132a,b is raw data, the data analyzer 312 can zero mean the sketch data 132a,b before the variance detector 308 determines the variance of the sketch data 132a,b using the zero-meaned data equations (e.g., Equations 1 through 10).

In examples disclosed herein in which the sketch data 132a,b includes multiple vectors of counts, each pair of vectors of counts includes a first vector of counts from the sketch data 132a, and a second vector of counts from the sketch data 132b. For each pair of vectors of counts, the example variance detector 308 generates a first variance based on Equation 1 below and a second variance based on Equation 2 below. The first variance corresponds to the first vector of counts from the sketch data A 132a. The second variance corresponds to the second vector of counts from sketch data B 132b. In such examples, the example variance detector 308 also determines a covariance for each pair of vector of counts based on Equation 3 below. Additionally, in some examples, the variance detector 308 weights each of the first and second variances and the covariance using a constant term related to the length of vectors (e.g., bin count, number of bins per vector) in a pair. The example variance detector 308 then generates weighted sum of variances and a weighted sum of covariances based on Equations 4, 5, and 6 below. Using the weighted sum of variances and the weighted sum of covariances, the example variance detector 308 may determine normalized weighted sum of variances and normalized weighted sum of covariances between sketch data A 132a and sketch data B 132b based on Equations 8, 9, and 10 below.

$$S_{xx}^{(j)} = \sum_{i=1}^{n^{(j)}} \left(x_i^{(j)}\right)^2 \qquad \text{Equation 1}$$

$$S_{yy}^{(j)} = \sum_{i=1}^{n^{(j)}} \left(y_i^{(j)}\right)^2 \qquad \text{Equation 2}$$

$$S_{xy}^{(j)} = \sum_{i=1}^{n^{(j)}} \left(x_i^{(j)}\right)\left(y_i^{(j)}\right) \qquad \text{Equation 3}$$

$$S'_{xx} = \sum_{j=1}^{m} \frac{S_{xx}^{(j)}}{c^{(j)}} \qquad \text{Equation 4}$$

$$S'_{yy} = \sum_{j=1}^{m} \frac{S_{yy}^{(j)}}{c^{(j)}} \qquad \text{Equation 5}$$

$$S'_{xy} = \sum_{j=1}^{m} \frac{S_{xy}^{(j)}}{c^{(j)}} \qquad \text{Equation 6}$$

$$c^{(j)} = p^{(j)}(1 - p^{(j)}) \qquad \text{Equation 7}$$

$$V'_{xx} = \frac{S'_{xx}}{N} = \frac{1}{N}\sum_{j=1}^{m} \frac{S_{xx}^{(j)}}{c^{(j)}} \qquad \text{Equation 8}$$

$$V'_{yy} = \frac{S'_{yy}}{N} = \frac{1}{N}\sum_{j=1}^{m} \frac{S_{yy}^{(j)}}{c^{(j)}} \qquad \text{Equation 9}$$

$$V'_{xy} = \frac{S'_{xy}}{N} = \frac{1}{N}\sum_{j=1}^{m} \frac{S_{xy}^{(j)}}{c^{(j)}} \qquad \text{Equation 10}$$

In the above Equations, m refers to the number of vectors of count pairs across both the sketch data A 132a and the sketch data B 132b, where j is the index of the vector pair (e.g., j={1, . . . , m}). In the above Equation 1, $x_i^{(j)}$ refers to the bin value for bin i in the first vector of counts in pair j corresponding to the sketch data A 132a. In the above Equation 2, $y_i^{(j)}$ refers to the bin value for bin i in the second vector of counts in pair j corresponding to the sketch data B 132b. $S_{xx}^{(j)}$ refers to the first variance of the bin values $x_i^{(j)}$ in the first vector of counts in pair j corresponding to the sketch data A 132a. $S_{yy}^{(j)}$ refers to the second variance of the bin values $y_i^{(j)}$ in the second vector of counts in pair j corresponding to the sketch data B 132b. In Equation 3, $S_{xy}^{(j)}$ refers to the covariance of the bin values $x_i^{(j)}$, $y_i^{(j)}$ between the first vector of counts and the second vector of counts in pair j. The term $n^{(j)}$ is the length of the vectors of counts in pair j (e.g., the number of bins in each of vector of counts in pair j). As $n^{(j)}$ increases, the accuracy of the estimate for the unique audience increases. In the above Equation 4, $S_{xx}'$ refers to the first weighted sum of variances of the bin values $x_i^{(j)}$ for the sketch data A 132a. In the above Equation 5, $S_{yy}'$ refers to the second weighted sum of variances of the bin values $y_i^{(j)}$ for the sketch data B 132b. In the above Equation 6, $S_{xy}'$ refers to the weighted sum of covariances of the bin values $x_i^{(j)}$, $y_i^{(j)}$ for the sketch data 132a,b. In the above Equations 4, 5 and 6, $c^{(j)}$ refers to a probability factor for vectors of counts pair j. The example probability factor $c^{(j)}$ (represented by lower-case c) is used to weight the weighted sums of variances and the weighted sum of covariances to normalize the contributions of vectors of counts of different lengths to the weighted sums of variances and the weighted sums of covariances. In Equation 7 above, the probability factor $c^{(j)}$ is based on a probability $p^{(j)}$ of a subscriber being assigned to a given bin in a vector of counts of pair j. In examples disclosed herein, the probability $p^{(j)}$ is based on the length of each vector of counts in pair j, where $p^{(j)}=1/n^{(j)}$. In the above Equation 8, $V_{xx}'$ refers to the normalized weighted sum of variances of the sketch data A 132a. In the above Equation 9, $V_{yy}'$ refers to the normalized weighted sum of variances of the sketch data B 132b. In the above Equation 10, $V_{xy}''$ refers to the normalized weighted sum of covariances of the sketch data A 132a and the sketch data B 132b. In Equations 8, 9, and 10 above, N refers to the sum of the lengths of all vectors of counts in the sketch data A 132a or the sketch data B 132b. |A| and |B| refer to the cardinality of the sketch data A 132a and the sketch data B 132b. In examples disclosed herein, the variance is a measure of variability in a list of numbers (e.g., bin values in the vectors of counts of the sketch data A 132a and/or the vectors of counts of the sketch data B 132b). In examples disclosed herein, the covariance is a measure of variability in two lists of numbers (e.g., bin values between bins for vectors of counts of the sketch data A 132a and the sketch data B 132b). In examples disclosed herein, the cardinality is the number of unique elements (e.g., subscribers) in the sketch data A 132a, in the sketch data B 132b, and/or between the sketch data A 132a and the sketch data B 132b.

Equations 1 through 10 above are used to determine the variances, the covariance, the weighted sum of variances, the weighted sum of covariances, the normalized weighted sum of variances, and the normalized weighted sum of covariances for zero-meaned data. The above equations can also be used for data that is not zero-meaned (e.g., raw data). In response to the variance detector 308 determining the normalized weighted sums of variances and the normalized weighted sum of covariance, the example variance detector 308 provides the normalized weighted sums of variances and normalized weighted sums of covariances and cardinality to the example noise checker 314.

The example noise checker 314 accounts for any noise that may have been intentionally inserted by the database proprietors 106a,b in their hashing of the raw data 226a,b (FIG. 2). Each database proprietor 106a,b may add its own noise independent of the other database proprietor 106a,b. For example, different degrees/types of noise may be added by the database proprietors 106a,b and/or one database proprietor 106a,b inserts noise while the other does not. When each database proprietor 106a,b provides multiple vectors of counts, the degree/types of noise added by each database proprietor 106a,b may also differ between the multiple vectors of counts. In the illustrated example, the database proprietors 106a,b inform the AME 102 of the value of the variance for the inserted noise distribution for each vector of counts. The example noise checker 314 sets noise parameters $V_1^{(j)}$ and $V_2^{(j)}$ of Equation 17 below to the respective inserted noise variance values from the database proprietors 106a,b. That is, each database proprietor 106a,b can choose its own noise distribution, no matter how complex, with its own set of parameters values, and can provide the value of the variance for each vector of counts to the AME 102 without needing to provide all the parameters of the noise distribution. In this manner, the AME 102 can use the variance of the noise for each vector of counts in each pair j ($V_1^{(j)}$ or $V_2^{(j)}$) in the estimation formulas for W (e.g., where W is the unique elements contained in both sketch data A 132a and sketch data B 132b). For example, this parameter may be the location and scale parameters for a Laplacian, the mean and variance of a Gaussian distribution, and/or even a complicated 5-parameter distribution. In the illustrated example, the database proprietors 106a,b can choose any noise distribution. When the parameters are numerically defined by the database proprietors 106a,b, a scalar singular number results. The scalar singular number is the variance for the distribution with the numerical values defined for the parameters. The scalar singular number is provided to the example noise checker 314. When no noise is present, the example noise checker 314 inputs a value of zero for the noise parameters $V_1^{(j)}$ and $V_2^{(j)}$ (e.g., if no noise parameter is given by the database proprietor 106a,b and an assumption of noise is not made). These noise terms are added to further obfuscate the sketch data 132a,b at a user level. This means that the noise terms make it harder for a third-party entity (e.g., the AME 102) to find out the identity of each specific element, which in turn protects privacies of PII data of subscribers of the database proprietors 106a,b. The example noise checker 314 accounts for the noise by selecting an equation (e.g., Equation 17 below) that accounts for noise for use by the coefficient generator 306 in subsequent operations.

The example audience metrics generator 112 is provided with the coefficient generator 306 to use the normalized weighted sums of variances, the normalized weighted sum of covariances, and the cardinality of the sketch data 132a,b to generate coefficients for a third-degree polynomial when there is no noise in the sketch data 132a,b. In the illustrated example, the audience metrics generator 112 selects which equations to use for determining an estimation of audience size based on determinations by the noise checker 314 of whether the sketch data 132a,b includes noise. For example, the audience metrics generator 112 selects Equations 11 through 15 below to determine an estimation of audience size in response to determining that the sketch data 132a,b does not include noise. Alternatively, in response to determining that the sketch data 132a,b includes noise, the audience metrics generator 112 selects Equation 17 to determine the estimation of audience size.

If the database proprietors 106a,b notify the AME 102 that there is no noise in the sketch data 132a,b, or the example noise checker 314 assumes that there is no noise in the sketch data 132a,b, the noise checker 314 selects Equations 11, 12, 13, and 14 shown below for use by the coefficient generator 306 to determine values of coefficient terms.

$$C_0 = -|A||B|V_{xy}'$$ Equation 11:

In Equation 11 above, the cardinality |A| of sketch data A 132a is multiplied by the cardinality |B| of sketch data B 132b, and the resulting product is multiplied by the normalized weighted sums of covariances $V_{xy}'$ found using Equation 10 above. This multiplication produces the coefficient term $C_0$ (represented by upper-case C). Under the no-noise condition, Equation 12 below is used to determine the value of the coefficient term $C_1$.

$$C_1 = |A|V_{yy}' + |B|V_{xx}' - |A||B|$$ Equation 12:

In Equation 12 above, the cardinality |A| is multiplied by the normalized weighted sum of variance of sketch data B 132b, $V_{yy}'$, found using Equation 9 above. This product is then added to the product of the cardinality |B| and the normalized weighted sum of variance of sketch data A 132a, $V_{xx}'$, found using Equation 8. The product of the cardinality |A| and the cardinality |B| is subtracted from the sum of products (e.g., $|A|V_{yy}' + |B|V_{xx}' - |A||B|$). The result is the coefficient term $C_1$. Under the no-noise condition, Equation 13 below is used to determine the value of the coefficient term $C_2$.

$$C_2 = -V_{xy}'$$ Equation 13:

In Equation 13 above, the coefficient term $C_2$ is simply the normalized weighted sum of covariance of the sketch data set A 132a and the sketch data set B 132b multiplied by negative one. Under the no-noise condition, Equation 14 below is used to determine the value of the coefficient term $C_3$.

$$C_3 = 1$$ Equation 14:

In Equation 14 above, the coefficient term $C_3$ is simply equal to one.

The real roots solver 310 then accesses the coefficients and creates a polynomial which it can solve in accordance with Equation 15 as shown below.

$$C_0 + C_1 W + C_2 W^2 + C_3 W^3 = 0$$ Equation 15:

In Equation 15 above, the coefficients are each multiplied by W which represents a number of unique elements that overlap or are duplicated between the sketch data A 132a and the sketch data B 132b (e.g., overlapping unique audience members) contained in both In this example, the real roots solver 310 solves the equation (e.g., using a commercial solver) and selects the real root value for W. For example, there might be multiplicity or complex roots, but the real root is selected as the answer that makes logical sense (e.g., indicates a positive real number for the number of overlapping unique audience members) as described in Equation 16 below.

$$UA = |A| + |B| - W$$ Equation 16:

In Equation 16 above, |A| is the cardinality or unique audience in set A, and |B| is the cardinality or unique audience in set B. Equation 16 above means the unique elements of A (e.g., |A|) with the unique elements of B (e.g., |B|), which may have some overlapping elements, has the elements that overlap or are in common in both sets (e.g., W), subtracted once which has the final result of unique audience (e.g., UA). For example, a complex number would not satisfy this requirement.

If the database proprietors 106a,b notify the AME 102 of the presence of noise, or the example noise checker 314 assumes the presence of noise, there is no analogous expression for the polynomial coefficients found using Equations 11, 12, 13, and 14. For multiple vectors of counts, the degree of the polynomial increases and, as such, there is no simple expression for the polynomial. Instead, the noise checker 314 informs the coefficient generator 306 that no coefficient terms are to be generated. The example noise checker 314 informs the numerical solver 315 to obtain an estimate of W using Equation 17 below.

Equation 17

$$\frac{\partial}{\partial W}\ell(W|D) = \frac{\partial}{\partial W}\ell\left(W \mid \{x, y\}_{i=1,\ldots,n(j)}^{j=1,\ldots,m}\right) =$$

$$\sum_{j=1}^{m} -\frac{c^{(j)^2} W\left(S_{yy}^{(j)}(|A|c^{(j)} + V_1^{(j)}) + S_{xx}^{(j)}(|B|c^{(j)} + V_2^{(j)}) - 2c^{(j)} S_{xy}^{(j)} W\right)}{\left((|A|c^{(j)} + V_1^{(j)})(|B|c^{(j)} + V_2^{(j)}) - c^{(j)^2} W^2\right)^2} \ldots +$$

$$\frac{c^{(j)^2} n^{(j)} W + c^{(j)^2} S_{xy}^{(j)}}{(|A|c^{(j)} + V_1^{(j)})(|B|c^{(j)} + V_2^{(j)}) - c^{(j)^2} W^2}$$

The right-hand side of Equation 17 above expresses the derivative of the sum of the log-likelihoods. In Equation 17 above, m refers to the number of pairs of vectors of counts across both the sketch data A 132a and the sketch data B 132b, where j is the index of the vector pair, |A| is the cardinality or unique audience in set A, and |B| is the cardinality or unique audience in set B. $V_1^{(j)}$ and $V_2^{(j)}$ are the variance of the noise for each vector of counts in each pair j corresponding to sketch data A 132a and sketch data B 132b, respectively. $S_{xx}^{(j)}$ and $S_{yy}^{(j)}$ refer to the first variance and the second variance for vectors of counts pair j, respectively, and $S_{xy}^{(j)}$ refers to the covariance for vectors of counts pair j. $n^{(j)}$ is the length of the vectors of counts in pair j (which is representative of the number of bins used in the vectors of counts in pair j). $c^{(j)}$ refers to the probability factor corresponding to vectors of counts pair j. When the derivative of the sum of the log-likelihoods for the vectors of counts is equal to zero (e.g., $$\frac{\partial}{\partial W}\ell(W|D) = 0),$$

Equation 17 above can be used to numerically solve for a value of W which represents an estimate of the overlap of audience members in both sets of sketch data 132a,b. The numerical solver 315 obtains an estimate of the overlap W (where W is the overlap of audience members in both sets of sketch data 132a,b). The example audience size generator 316 then accesses the unique audience estimate 318 and the overlap Wand stores the unique audience estimate 318 and the overlap W in memory. The example audience size generator 316 can transform the resultant unique audience estimate data 318 into a form that a receiving party (e.g., a customer of audience metrics analytics services) can understand that may have both the overlap W and the unique audience UA listed which explains the demographics reached by the media. The audience size generator 316 can also solve for a variance of the estimate of the overlap W using Equation 18 below.

$$\text{Var}[W] = \frac{(AB - W^2)^2}{N(AB + W^2)} \quad \text{Equation 18}$$

In Equation 18 above, Var[W] refers to the variance of the estimate of the overlap W, A refers to the cardinality of the sketch data A 132a, B refers to the cardinality of the sketch data B 132b, and N refers to the sum of the lengths of all vectors of counts in the sketch data A 132a or the sketch data B 132b.

A numerical example employing the above techniques involves the database proprietor A 106a having 1000 unique subscribers (e.g., cardinality |A| equal to 1000), and the database proprietor B 106b having 2000 unique subscribers (e.g., cardinality |B| equal to 2000). The subscribers are audience members that accessed particular media. The example database proprietor A 106a provides the sketch data A 132a (e.g., data set A) to the AME computer 110, and the example database proprietor B 106b provides the sketch data B 132b (e.g., data set B) to the AME computer 110. In this example, of each the data set A and the data set B includes two vectors of counts. The first vector of counts has a length of 5 and the second vector of counts has a length of 10. In this example, the first vector of counts for the data set A is $V_A^1=\{191, 190, 212, 190, 217\}$ and the second vector of counts for the data set A is $V_A^2=\{102, 109, 97, 107, 90, 121, 89, 83, 98, 104\}$. Further, the first vector of counts for the data set B is $V_B^1=\{361, 379, 427, 431, 402\}$ and the second vector of counts for the data set B is $V_B^2=\{206, 216, 206, 209, 166, 205, 166, 203, 197, 226\}$. In this example, the example data analyzer 312 determines that the vectors of counts are zero-meaned data.

In this example, using Equation 1 above, the example variance detector 308 generates a first variance for the first vector of counts $V_A^1$ of the data set A (e.g., $S_{xx}^{(1)}=714$), and a first variance for the second vector of counts $V_A^2$ of the data set A (e.g., $S_{xx}^{(2)}=1,114$). Further, using Equation 2 above, the example variance detector 308 generates a second variance for the first vector of counts $V_B^1$ of the data set B (e.g., $S_{yy}^{(1)}=3,656$), and a second variance for the second vector of counts $V_B^2$ of the data set B (e.g., $S_{yy}^{(2)}=3,440$). In this example, using Equation 3 above, the example variance detector 308 generates a covariance for the first vectors of counts $V_A^1$ and $V_B^1$ (e.g., $S_{xy}^{(1)}=609$), and a covariance for the second vectors of counts $V_A^2$ and $V_B^2$ (e.g., $S_{xy}^{(2)}=1,079$).

In this example, using Equation 4 above, the example variance detector 308 generates a first weighted sum of variances ($S_{xx}'=16,840.3$) for the data set A based on the first variances $S_{xx}^{(1)}$ and $S_{xx}^{(2)}$. Further, using Equation 5 above, the example variance detector 308 generates a second weighted sum of variances ($S_{yy}'=61,072.2$) for the data set B based on the second variances $S_{yy}^{(1)}$ and $S_{yy}^{(2)}$. In this example, using Equation 6 above, the example variance detector 308 generates a weighted sum of covariances ($S_{xy}'=15,795.1$) for the data set A and the data set B based on the covariances $S_{xy}^{(1)}$ and $S_{xy}^{(2)}$.

In this example, using Equation 8 above, the example variance detector 308 generates a first normalized weighted sum of variances ($V_{xx}'=1,122.69$) for the data set A based on the first weighted sum of variances $S_{xx}'$. Further, using Equation 9 above, the example variance detector 308 generates a second normalized weighted sum of variances ($V_{yy}'=4,071.48$) for the data set B based on the second weighted sum of variances $S_{yy}'$. In this example, using Equation 10 above, the example variance detector 308 generates a normalized weighted sum of covariances ($V_{xy}'=1,053.01$) for the data set A and the data set B based on the weighted sum of covariances $S_{xy}'$.

In this example, the example noise checker 314 determines that no noise is present in the data set A and/or the data set B. As such, the example noise checker 314 sets noise parameters for the data set A ($V_1^{(1)}$ and $V_1^{(2)}$) and noise parameters for the data set B ($V_2^{(1)}$ and $V_2^{(2)}$) equal to zero. In this example, the example coefficient generator 306 determines values for coefficients ($c_0=-2.10602\times10^9$, $c_1=4.31685\times10^6$, $c_2=-1,053.01$, $c_3=1$) based on Equations 11 through 14 above. Further, the example real roots solver 310 solves for the roots of a third-degree polynomial using Equation 15 above based on the determined coefficients. In this example, the example real roots solver 310 selects the real root value of W as the estimate of the overlap (W=521.8) of unique audience members between the data set A and the data set B. Further, using Equation 16 above, the example audience size generator 316 determines the unique audience estimate 318 based on the overlap W, the cardinality of data set A, and the cardinality of data set B.

In this example, the actual overlap W of unique audience members between the data set A and the data set B is 500. An estimate of the overlap using only the first pair of vectors of counts of length 5 is W=361.6. An estimate of the overlap using only the second pair of vectors of counts of length 10 is W=608.8. Both of these estimates for the overlap W are less accurate than the estimated overlap W=521.8 determined using both pairs of vectors of counts. As such, using multiple pairs of vectors of counts can provide a more accurate unique audience estimate compared to using only a single pair of vectors of counts.

The estimate of the overlap using multiple pairs of vectors of counts or a single pair of vector of counts is unbiased. That is, for estimates of the overlap obtained across many trials, using one or more different hash functions and/or one or more different vector of counts sizes for each trial, an average of the estimates across all trials is close to the true overlap. Further, increasing the number of trials moves the average of the estimates across all trials closer to the true overlap. In this example, the audience size generator 316 can also determine a true variance of the estimate based on Equation 18 using the true value of the overlap (e.g., W=500). The true variance of the estimate using only the first pair of vectors of counts is W=272,222.2. The true variance of the estimate using only the second pair of vectors of counts is W=136,111.1. The true variance of the estimate using both pairs of vectors of counts is W=90,740.7. A variance of the estimate using multiple vectors of counts is less than a variance of the estimate using a single vector of counts (e.g., using only the first pair of vectors of counts or the second pair of vectors of counts). As such, a confidence in the estimate of the overlap using multiple pairs of vectors of counts is greater than a confidence in the estimate of the overlap using only a single pair of vectors of counts. In other words, an error between the estimate of the overlap and the true overlap is decreased when using multiple pairs of vectors of counts compared to a single pair of vectors of counts.

Examples disclosed herein use Maximum Likelihood. An example theorem of Maximum Likelihood is that an efficient estimator estimates the quantity of interest in some "best possible" manner. For example, by the Cramér-Rao bound, the maximum likelihood estimate is the lowest variance any unbiased estimate can be. Other unbiased estimators will have higher variance. Examples disclosed herein can use Fisher's Information to derive the variance of the unique audience estimate 318 (e.g., which is used in Cramer-Rao bound).

In examples disclosed herein, the sufficient statistic of a bivariate normal is the mean and covariance matrix. Given those two values, the entire distribution is determined. Using mean-centering (either given, or in the formula), the sufficient statistic is just the covariance matrix. Of the four terms within the 2×2 matrix, only three are needed (as one term appears twice). These are the normalized weighted sum of variances of the sketch data A 132a ($V_{xx}'$), the normalized weighted sum of variances of the sketch data B 132b ($V_{yy}'$), and the normalized weighted sum of covariances of both the sketch data A 132a and the sketch data B 132b ($V_{xy}'$) (e.g., $\{V_{xx}', V_{yy}', V_{xy}'\}$).

Examples disclosed herein can use the complete sufficient statistics $\{V_{xx}', V_{yy}', V_{xy}'\}$ to the maximum information allowed (e.g., Fisher's information) to produce the smallest variance of the estimate possible (e.g., via Cramer-Rao bound). In some examples, it is the theoretically optimal estimate for the sketch data 132a,b and model provided.

In examples disclosed herein, the coefficient generator 306 may implement means for determining coefficient values, the real roots solver 310 may implement means for determining a real root value, the audience size generator 316 may implement means for determining an audience size, the variance detector 308 may implement means for determining normalized weighted sums of variances and normalized weighted sums of covariances, the data analyzer 312 may implement means for zero-meaning data, the noise checker 314 may implement means for selecting equations, and the numerical solver 315 may implement means for determining an overlap of audience members.

While an example manner of implementing the example audience metrics generator 112 of FIG. 1 is illustrated in FIG. 3, one or more of the elements, processes and/or devices illustrated in FIG. 3 may be combined, divided, re-arranged, omitted, eliminated and/or implemented in any other way. Further, the example data interface 304, the example coefficient generator 306, the example variance detector 308, the example real roots solver 310, the example data analyzer 312, the example noise checker 314, the example numerical solver 315, and the example audience size generator 316 and/or, more generally, the example audience metrics generator 112 of FIG. 3 may be implemented by hardware, software, firmware and/or any combination of hardware, software and/or firmware. Thus, for example, any of the example data interface 304, the example coefficient generator 306, the example variance detector 308, the example real roots solver 310, the example data analyzer 312, the example noise checker 314, the example numerical solver 315, and the example audience size generator 316 and/or, more generally, the example audience metrics generator 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 304, the example coefficient generator 306, the example variance detector 308, the example real roots solver 310, the example data analyzer 312, the example noise checker 314, the example numerical solver 315, and/or the example audience size generator 316 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience metrics generator 112 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
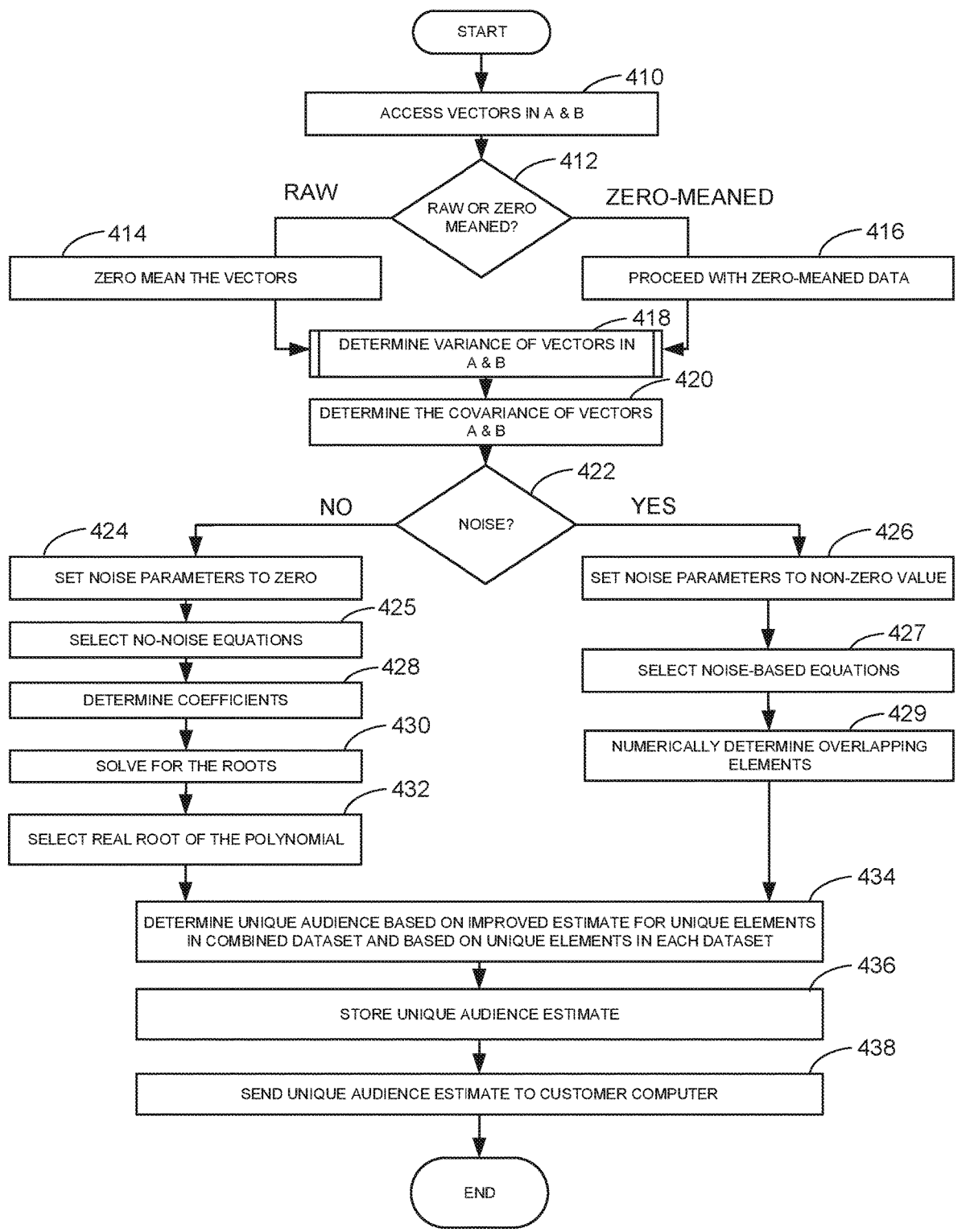
FIG. 4 is a flowchart representative of example machine-readable instructions which may be executed to implement the example audience metrics generator of FIGS. 1-3 to estimate audience sizes of media using deduplication based on multiple vectors of counts in accordance with teachings of this disclosure.

A flowchart representative of example hardware logic, machine readable instructions, hardware implemented state machines, and/or any combination thereof for implementing the audience metrics generator 112 of FIGS. 1-3 is shown in FIG. 4. The machine-readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example audience metrics generator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example process of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine-readable instructions which may be executed to implement the example audience metrics generator 112 of FIGS. 1-3 to estimate unique audience sizes of media using deduplication based on variance, covariance, and cardinality of multiple vectors of counts from the database proprietors 106a,b of FIGS. 1-3. In the example of FIG. 4, the same media item (e.g., an advertisement, a movie, a movie trailer, a song, a web page banner, etc.) is presented by both of the database proprietors 106a,b. The example AME computer 110 executes the instructions represented by the flowchart of FIG. 4 to generate the unique audience estimate 318 (FIG. 3) based on the sketch data A 132a from the database proprietor A 106a and the sketch data B 132b from the database proprietor B 106b. In this manner, the AME computer 110 can use the unique audience estimate 318 as a representation of the unique audience size reached by both of the database proprietors 106a,b serving the same media.

The program of FIG. 4 begins at block 410 at which the example data interface 304 (FIG. 3) accesses multiple vectors of counts in the sketch data A 132a and multiple vectors of counts in the sketch data B 132b. For example, the multiple vectors of counts in the sketch data A 132a can include $V_A^1$={bin 1, bin 2, bin 3, bin 4, bin 5} and $V_A^2$={bin 1, bin 2, bin 3, bin 4, bin 5, bin 6, bin 7, bin 8, bin 9, bin 10}, and the multiple vectors of counts in the sketch data B 132b can include $V_B^1$={bin 1, bin 2, bin 3, bin 4, bin 5} and $V_B^2$={bin 1, bin 2, bin 3, bin 4, bin 5, bin 6, bin 7, bin 8, bin 9, bin 10}. At block 412, the data analyzer 312 (FIG. 3) determines whether the vectors of counts in the sketch data 132a,b are raw data or zero-meaned data. In the illustrated example, if the sketch data 132a,b is raw data, the data analyzer 312 zero-means the sketch data 132a,b. If at block 412, the data analyzer 312 determines that the sketch data 132a,b is zero-meaned, control proceeds with the zero-meaned data (block 416).

At block 418, the example variance detector 308 (FIG. 3) determines the normalized weighted sum of variance of the vectors of counts in the sketch data A 132a ($V_{xx}'$) and the normalized weighted sum of variance of the vectors of counts in the sketch data B 132b ($V_{yy}'$). Example instructions that may be used to implement block 418 to determine the normalized weighted sum of variance of the vectors of counts in the sketch data A 132a ($V_{yy}'$) and the normalized weighted sum of variance of the vectors of counts in the sketch data B 132b ($V_{yy}'$) are described below in connection with FIG. 5. At block 420, the example variance detector 308 determines the normalized weighted sum of covariances of the vectors of counts of both the sketch data A 132a and the sketch data B 132b ($V_{xy}'$).

At block 422, the example noise checker 314 (FIG. 3) determines whether noise is present in the sketch data 132a,b. If no noise is present (block 422: NO), the example noise checker 314 sets the noise parameters (e.g., $V_1^{(j)}$ and/or $V_2^{(j)}$) equal to zero (block 424). The example noise checker 314 selects no-noise equations (block 425). For example, the example noise checker 314 selects Equations 11 through 15 above to be used for solving for determining the overlap W of unique audience members between the sketch data A 132a and the sketch data B 132b. If noise is present (block 422: YES), the example noise checker 314 sets the noise parameters equal to a non-zero value (block 426). The example noise checker 314 selects a noise-based equation (block 427). For example, the example noise checker 314 selects Equation 17 above to be used for solving for determining the overlap W of unique audience members between the sketch data A 132a and the sketch data B 132b. For example, the audience metrics generator 112 may receive non-zero values for noise for each vector of counts in the respective sketch data 132a,b from corresponding ones of the database proprietors 106a,b. The example noise checker 314 sets the noise parameters $V_1^{(j)}$ and/or $V_2^{(j)}$ of Equation 17 above equal to the received non-zero values.

If noise is not present, the example coefficient generator 306 (FIG. 3) determines values for coefficients as described above in connection with FIG. 3. The example real roots solver 310 (FIG. 3) solves for roots of a third-degree polynomial based on the coefficients (block 430). For example, the example real roots solver 310 may solve for the roots using Equation 15 as described above. The example real roots solver 310 selects the real root value of the polynomial (block 432). For example, the example real roots solver 310 selects the real root of the polynomial by selecting the answer that makes logical sense (e.g., indicates a positive real number for the number of overlapping unique audience members) as described in Equation 16 above. If noise is present, at block 429, the example numerical solver 315 (FIG. 3) numerically solves for the number of overlapping elements in both sketch data A 132a and sketch data B 132b. For example, the example numerical solver 315 numerically solves for the number of unique audience members that overlap or are in common in both sketch data 132a,b by solving for the overlap W in Equation 17 above.

The example audience size generator 316 (FIG. 3) determines the unique audience estimate 318 (FIG. 3) based on an improved estimate for unique elements (e.g., unique audience members) in both the sketch data A 132a and the sketch data B 132b, and based on overlapping elements W (e.g., overlapping audience members) in both the sketch data A 132a and the sketch data B 132b (block 434). For example, the unique audience estimate 318 represents the unique audience size reached by the media 114 served by both database proprietors 106a,b. The example audience size generator 316 stores the unique audience estimate 318 in a memory (block 436). The example audience size generator 316 sends the unique audience estimate 318 to a customer computer (block 438) through, for example, one or more network communications. The example process of FIG. 4 then ends.

Figure 5:
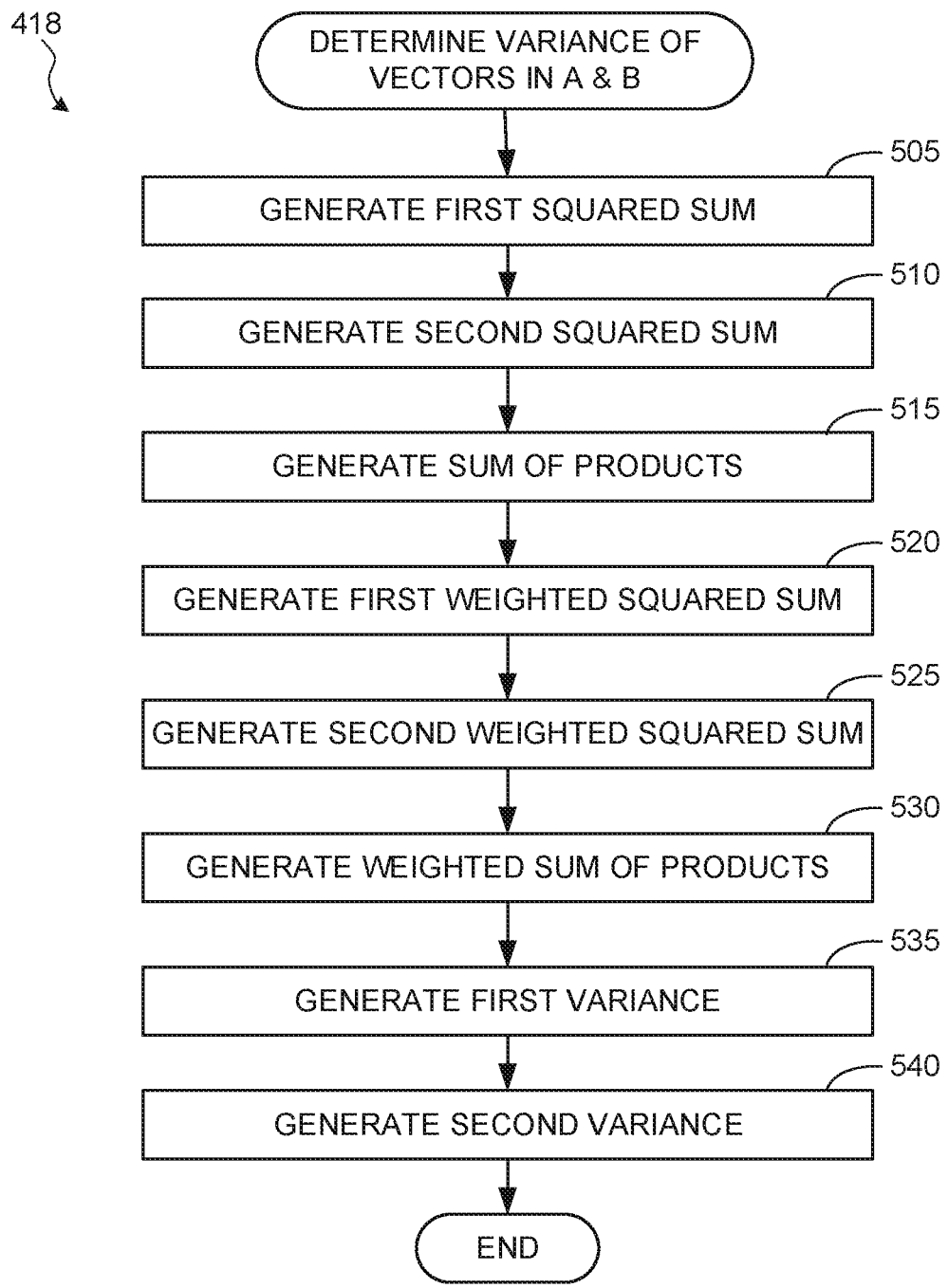
FIG. 5 is a flowchart representative of example machine-readable instructions which may be executed to implement the example audience metrics generator of FIGS. 1-3 to determine a variance of server-collected impression data in accordance with teachings of this disclosure.

FIG. 5 is a flowchart representative of example machine-readable instructions which may be executed to implement the example audience metrics generator 112 of FIG. 3 to determine the normalized weighted sum of variance of sketch data A 132a and the normalized weighted sum of variance of sketch data B 132b. The example instructions of FIG. 5 may be used to implement block 418 of FIG. 4.

The example program of FIG. 5 begins at block 505 at which the example variance detector 308 (FIG. 3) generates a first variance ($S_{xx}^{(j)}$). For example, the example variance finder generates the first variance of the bin values from the multiple vectors of counts in sketch data A 132a using Equation 1 above. At block 510, the example variance detector 308 generates a second variance ($S_{yy}^{(j)}$). For example, the example variance detector 308 generates the second variance of the bin values from the multiple vectors of counts in sketch data B 132b using Equation 2 above. At block 515, the example variance detector 308 generates a covariance ($S_{xy}^{(j)}$). For example, the example variance detector 308 generates the covariance of the bin values from the multiple vectors of counts from the sketch data A 132a and the multiple vectors of counts from the sketch data B 132b using Equation 3 above.

At block 520, the example variance detector 308 generates a first weighted sum of variances ($S_{xx}'$). For example, the example variance detector 308 generates the first weighted sum of variances corresponding to sketch data A 132a using Equation 4 above based on the first variances generated at block 505. At block 525, the example variance detector 308 generates a second weighted sum of variances ($S_{yy}'$). For example, the example variance detector 308 generates the second weighted sum of variances corresponding to sketch data B 132b using Equation 5 above based on the second variances generated at block 510. At block 530, the example variance detector 308 generates a weighted sum of covariances ($S_{xy}'$). For example, the example variance detector 308 generates the weighted sum of covariances corresponding to sketch data A 132a and sketch data B 132b using Equation 6 above based on the covariances generated at block 515.

At block 535, the example variance detector 308 generates a first normalized weighted sum of variances ($V_{xx}'$). For example, the example variance detector 308 generates the first normalized weighted sum of variances corresponding to sketch data A 132a using Equation 8 above based on the first weighted sum of variances generated at block 520. At block 540, the example variance detector 308 generates a second normalized weighted sum of variances ($V_{yy}'$). For example, the example variance detector 308 generates the second normalized weighted sum of variances corresponding to sketch data B 132b using Equation 9 above based on the second weighted sum of variances generated at block 525. The example process of FIG. 5 then returns to a calling function or process such as implemented by the example instructions of FIG. 4.

Figure 6:
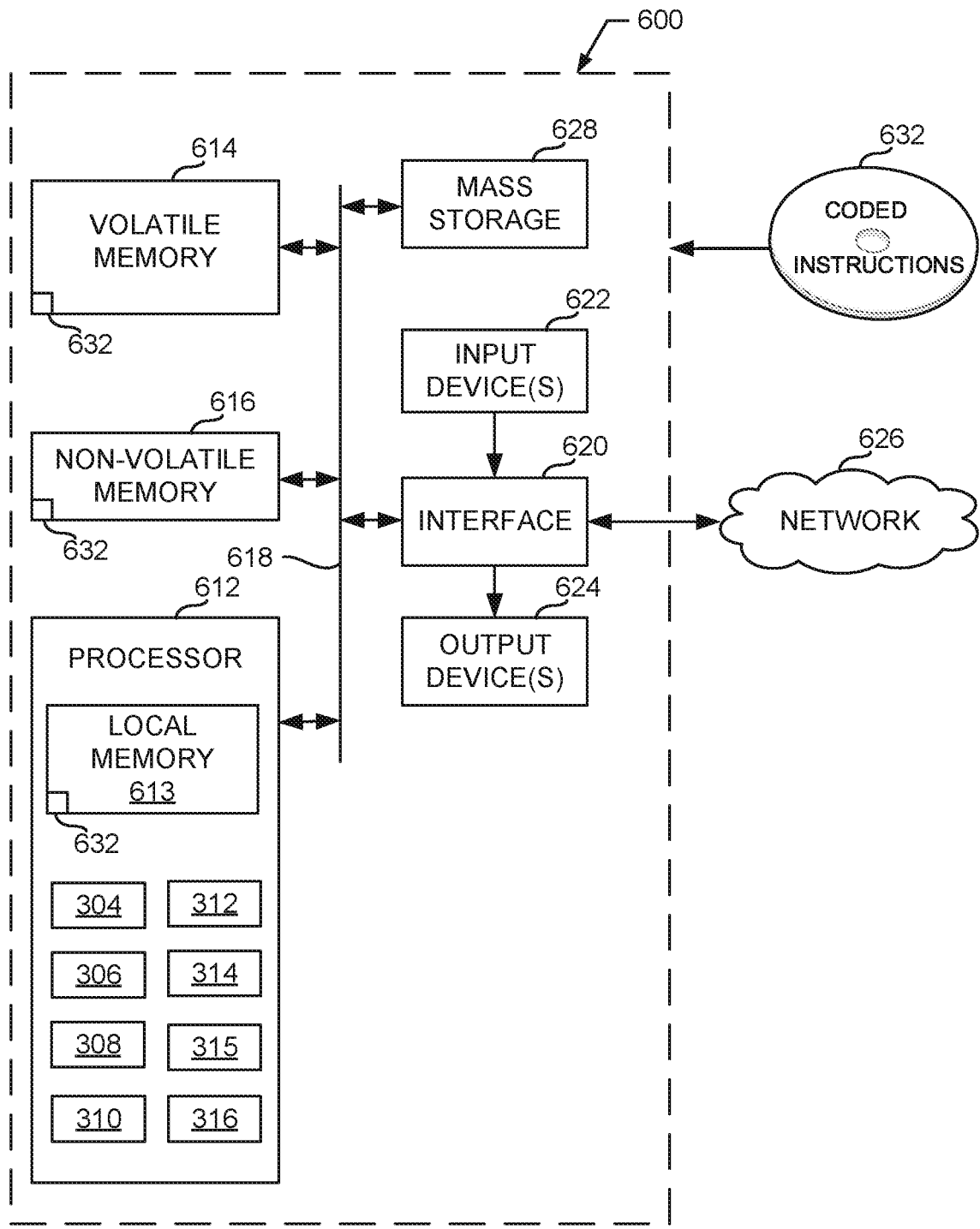
FIG. 6 is a block diagram of an example processing platform structured to execute the instructions of FIGS. 4 and 5 to implement the example audience metrics generator of FIGS. 1-3 to estimate audience sizes of media using deduplication based on multiple vectors of counts in accordance with teachings of this disclosure.

FIG. 6 is a block diagram of an example processor platform 600 structured to execute the instructions of FIGS. 4 and 5 to implement the example audience metrics generator 112 of FIGS. 1-3. The processor platform 600 can be, for example, a server, a personal computer, a workstation, a self-learning machine (e.g., a neural network), or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data interface 304, the example coefficient generator 306, the example variance detector 308, the example real roots solver 310, the example data analyzer 312, the example noise checker 314, the example numerical solver 315, and the example audience size generator 316.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

Machine-executable instructions 632 represented by the flowchart of FIG. 4 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that estimate audience sizes using deduplication based on multiple vectors of counts from multiple database proprietors using server-collected impression data. The disclosed methods, apparatus and articles of manufacture may be used to deduplicate data between any two data sets while preserving privacy. Examples of such two data sets could be audiences, email addresses, banking information, lists of purchased items, store visits, traffic patterns, etc. While examples disclosed herein are described in connection with estimating audience sizes for media, examples disclosed herein are not limited to use with audience metrics. The disclosed methods, apparatus and articles of manufacture improve the efficiency of using a computing device by reducing the amount of processing and amount of memory required to estimate unique audience sizes of media items based on audience measurements across two or more database proprietors. Using improved techniques based on multiple vectors of counts to estimate unique audience disclosed herein, the number of hashes to reach a desired confidence and accuracy declines as overlap (W) increases, whereas prior techniques for generating covariance estimates may need more and more hashes to get the same desired result. Examples disclosed herein improve the accuracy of estimating unique audience size as the number of vectors of counts provided by the database proprietors increases. The cost savings in computation, memory, and speed can be orders of magnitude in improvement over prior techniques. The disclosed methods, apparatus and articles of manufacture are accordingly directed to one or more improvement(s) in the functioning of a computer.

Example 1 includes an apparatus to determine an audience size for media based on sketch data. The apparatus of Example 1 includes a coefficient generator to determine coefficient values for a polynomial based on normalized weighted sums of variances, a normalized weighted sum of covariances, and cardinalities corresponding to a first plurality of vectors of counts from a first database proprietor and a second plurality of vectors of counts from a second database proprietor, a real roots solver to determine a real root value of the polynomial, the real root value indicative of a number of audience members represented in the first plurality of vectors of counts that are also represented in the second plurality of vectors of counts, and an audience size generator to determine the audience size based on the real root value and the cardinalities of the first plurality of vectors of counts and the second plurality of vectors of counts.

Example 2 includes the apparatus of Example 1, and further includes a variance detector to determine the normalized weighted sums of variances and the normalized weighted sum of covariances corresponding to the first plurality of vectors of counts and the second plurality of vectors of counts.

Example 3 includes the apparatus of Example 2, wherein the variance detector is to determine the normalized weighted sums of variances and the normalized weighted sum of covariances by generating a plurality of first variances based on the first plurality of vectors of counts, generating a plurality of second variances based on the second plurality of vectors of counts, and generating a plurality of covariances based on the first plurality of vectors of counts and the second plurality of vectors of counts.

Example 4 includes the apparatus of Example 3, wherein the variance detector is to determine the normalized weighted sum of variances and the normalized weighted sum of covariances by generating a first weighted sum of variances based on the plurality of first variances, the first weighted sum of variances corresponding to a first normalized weighted sum of variances of the first plurality of vectors of counts, generating a second weighted sum of variances based on the plurality of second variances, the second weighted sum of variances corresponding to a second normalized weighted sum of variances of the second plurality of vectors of counts, and generating a weighted sum of covariances based on the plurality of covariances, the weighted sum of covariances corresponding to a normalized weighted sum of covariances of the first plurality of vectors of counts and the second plurality of vectors of counts.

Example 5 includes the apparatus of Example 4, wherein the variance detector is to generate the first weighted sum of variances, the second weighted sum of variances, and the weighted sum of covariances based on a probability factor corresponding to lengths of the first plurality of vectors of counts and the second plurality of vectors of counts.

Example 6 includes the apparatus of Example 1, and further includes a data analyzer to zero-mean data in at least one of the first plurality of vectors of counts or the second plurality of vectors of counts before the coefficient generator is to determine the coefficient values.

Example 7 includes the apparatus of Example 1, and further includes a noise checker to select equations to be used by the coefficient generator in response to obtaining a noise term from at least one of the first database proprietor or the second database proprietor.

Example 8 includes a method to determine an audience size for media based on sketch data. The method of Example 8 includes determining coefficient values for a polynomial based on normalized weighted sums of variances, a normalized weighted sum of covariances, and cardinalities corresponding to a first plurality of vectors of counts from a first database proprietor and a second plurality of vectors of counts from a second database proprietor, determining a real root value of the polynomial, the real root value indicative of a number of audience members represented in the first plurality of vectors of counts that are also represented in the second plurality of vectors of counts, and determining the audience size based on the real root value and the cardinalities of the first plurality of vectors of counts and the second plurality of vectors of counts.

Example 9 includes the method of Example 8, and further includes determining the normalized weighted sums of variances and the normalized weighted sum of covariances corresponding to the first plurality of vectors of counts and the second plurality of vectors of counts.

Example 10 includes the method of Example 9, wherein the determining of the normalized weighted sums of variances and the normalized weighted sum of covariances includes generating a plurality of first variances based on the first plurality of vectors of counts, generating a plurality of second variances based on the second plurality of vectors of counts, and generating a plurality of covariances based on the first plurality of vectors of counts and the second plurality of vectors of counts.

Example 11 includes the method of Example 10, wherein the determining of the normalized weighted sum of variances and the normalized weighted sum of covariances includes generating a first weighted sum of variances based on the plurality of first variances, the first weighted sum of variances corresponding to a first normalized weighted sum of variances of the first plurality of vectors of counts, generating a second weighted sum of variances based on the plurality of second variances, the second weighted sum of variances corresponding to a second normalized weighted sum of variances of the second plurality of vectors of counts, and generating a weighted sum of covariances based on the plurality of covariances, the weighted sum of covariances corresponding to a normalized weighted sum of covariances of the first plurality of vectors of counts and the second plurality of vectors of counts.

Example 12 includes the method of Example 11, wherein the generating of the first weighted sum of variances, the second weighted sum of variances, and the weighted sum of covariances is based on a probability factor corresponding to lengths of the first plurality of vectors of counts and the second plurality of vectors of counts.

Example 13 includes the method of Example 8, and further includes zero-meaning data in at least one of the first plurality of vectors of counts or the second plurality of vectors of counts before determining the coefficient values.

Example 14 includes the method of Example 8, and further includes selecting equations to be used in response to obtaining a noise term from at least one of the first database proprietor or the second database proprietor.

Example 15 includes a non-transitory computer readable storage medium to determine an audience size for media based on sketch data. The non-transitory computer readable storage medium of Example 15 includes instructions that, when executed, cause at least one processor to at least determine coefficient values for a polynomial based on normalized weighted sums of variances, a normalized weighted sum of covariances, and cardinalities corresponding to a first plurality of vectors of counts from a first database proprietor and a second plurality of vectors of counts from a second database proprietor, determine a real root value of the polynomial, the real root value indicative of a number of audience members represented in the first plurality of vectors of counts that are also represented in the second plurality of vectors of counts, and determine the audience size based on the real root value and the cardinalities of the first plurality of vectors of counts and the second plurality of vectors of counts.

Example 16 includes the non-transitory computer readable storage medium of Example 15, wherein the instructions, when executed, cause the processor to determine the normalized weighted sums of variances and the normalized weighted sum of covariances corresponding to the first plurality of vectors of counts and the second plurality of vectors of counts.

Example 17 includes the non-transitory computer readable storage medium of Example 16, wherein the instructions, when executed, cause the processor to determine the normalized weighted sums of variances and the normalized weighted sum of covariances by generating a plurality of first variances based on the first plurality of vectors of counts, generating a plurality of second variances based on the second plurality of vectors of counts, and generating a plurality of covariances based on the first plurality of vectors of counts and the second plurality of vectors of counts.

Example 18 includes the non-transitory computer readable storage medium of Example 17, wherein the instructions, when executed, cause the processor to determine the normalized weighted sum of variances and the normalized weighted sum of covariances by generating a first weighted sum of variances based on the plurality of first variances, the first weighted sum of variances corresponding to a first normalized weighted sum of variances of the first plurality of vectors of counts, generating a second weighted sum of variances based on the plurality of second variances, the second weighted sum of variances corresponding to a second normalized weighted sum of variances of the second plurality of vectors of counts, and generating a weighted sum of covariances based on the plurality of covariances, the weighted sum of covariances corresponding to a normalized weighted sum of covariances of the first plurality of vectors of counts and the second plurality of vectors of counts.

Example 19 includes the non-transitory computer readable storage medium of Example 18, wherein the instructions, when executed, cause the processor to generate the first weighted sum of variances, the second weighted sum of variances, and the weighted sum of covariances based on a probability factor corresponding to lengths of the first plurality of vectors of counts and the second plurality of vectors of counts.

Example 20 includes the non-transitory computer readable storage medium of Example 15, wherein the instructions, when executed, cause the processor to zero-mean data in at least one of the first plurality of vectors of counts or the second plurality of vectors of counts before determining the coefficient values.

Example 21 includes the non-transitory computer readable storage medium of Example 15, wherein the instructions, when executed, cause the processor to select equations to be used in response to obtaining a noise term from at least one of the first database proprietor or the second database proprietor.

Example 22 includes an apparatus to determine an audience size for media based on sketch data. The apparatus of Example 22 includes means for determining coefficient values for a polynomial based on normalized weighted sums of variances, a normalized weighted sum of covariances, and cardinalities corresponding to a first plurality of vectors of counts from a first database proprietor and a second plurality of vectors of counts from a second database proprietor, means for determining a real root value of the polynomial, the real root value indicative of a number of audience members represented in the first plurality of vectors of counts that are also represented in the second plurality of vectors of counts, and means for determining the audience size based on the real root value and the cardinalities of the first plurality of vectors of counts and the second plurality of vectors of counts.

Example 23 includes the apparatus of Example 22, and further includes means for determining the normalized weighted sums of variances and the normalized weighted sum of covariances corresponding to the first plurality of vectors of counts and the second plurality of vectors of counts.

Example 24 includes the apparatus of Example 23, wherein the means for determining the normalized weighted sums of variances and the normalized weighted sum of covariances is to determine the normalized weighted sums of variances and the normalized weighted sum of covariances by generating a plurality of first variances based on the first plurality of vectors of counts, generating a plurality of second variances based on the second plurality of vectors of counts, and generating a plurality of covariances based on the first plurality of vectors of counts and the second plurality of vectors of counts.

Example 25 includes the apparatus of Example 24, wherein the means for determining the normalized weighted sums of variances and the normalized weighted sum of covariances is to determine the normalized weighted sum of variances and the normalized weighted sum of covariances by generating a first weighted sum of variances based on the plurality of first variances, the first weighted sum of variances corresponding to a first normalized weighted sum of variances of the first plurality of vectors of counts, generating a second weighted sum of variances based on the plurality of second variances, the second weighted sum of variances corresponding to a second normalized weighted sum of variances of the second plurality of vectors of counts, and generating a weighted sum of covariances based on the plurality of covariances, the weighted sum of covariances corresponding to a normalized weighted sum of covariances of the first plurality of vectors of counts and the second plurality of vectors of counts.

Example 26 includes the apparatus of Example 25, wherein the means for determining the normalized weighted sums of variances and the normalized weighted sum of covariances is to generate the first weighted sum of variances, the second weighted sum of variances, and the weighted sum of covariances based on a probability factor corresponding to lengths of the first plurality of vectors of counts and the second plurality of vectors of counts.

Example 27 includes the apparatus of Example 22, and further includes means for zero-meaning data in at least one of the first plurality of vectors of counts or the second plurality of vectors of counts before the means for determining the coefficient values is to determine the coefficient values.

Example 28 includes the apparatus of Example 22, and further includes means for selecting equations to be used by the means for determining the coefficient values in response to obtaining a noise term from at least one of the first database proprietor or the second database proprietor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to determine an audience size for media based on sketch data, the apparatus comprising:

memory;

programmable circuitry; and instructions to cause the programmable circuitry to:

obtain (a) first sketch data included in a first network communication from a first server of a first database proprietor and (b) second sketch data included in a second network communication from a second server of a second database proprietor, the first sketch data to represent a first audience of a media item including first subscribers of the first database proprietor, the second sketch data to represent a second audience of the media item including second subscribers of the second database proprietor, the first sketch data including a first plurality of vectors of counts, each vector of counts of the first plurality of vectors of counts representing the first audience as a distribution of first hash values, the first hash values corresponding to the first subscribers and generated using a hash algorithm, each vector of counts of the first plurality of vectors of counts including a plurality of bins having respective bin numbers, the first hash values usable to determine bin numbers for assigning the first subscribers to respective bins of the plurality of bins, the second sketch data including a second plurality of vectors of counts, each vector of counts of the second plurality of vectors of counts representing the second audience as a distribution of second hash values, the second hash values corresponding to the second subscribers and generated using the hash algorithm, each vector of counts of the second plurality of vectors of counts including the plurality of bins, the second hash values usable to determine bin numbers for assigning the second subscribers to respective bins of the plurality of bins, the first and second sketch data to preserve privacy of the first and second subscribers by representing the first and second subscribers via the first and second pluralities of vectors of counts instead of sharing identifying information associated with the first and second subscribers, wherein the first audience is known to the first database proprietor but not to the second database proprietor, and wherein the second audience is known to the second database proprietor but not to the first database proprietor;

determine coefficient values for a polynomial based on (a) normalized weighted sums of variances, (b) a normalized weighted sum of covariances, and (c) cardinalities, the normalized weighted sums of variances, the normalized weighted sum of covariances, and the cardinalities corresponding to the first plurality of vectors of counts and the second plurality of vectors of counts;

determine a real root value of the polynomial, the real root value indicative of a number of audience members of the first audience represented in the first plurality of vectors of counts that are also represented in the second plurality of vectors of counts;

determine the audience size based on the real root value and the cardinalities of the first plurality of vectors of counts and the second plurality of vectors of counts; and cause transmission of the audience size to a customer computer.

2. The apparatus of claim 1, wherein the instructions are to cause the programmable circuitry to determine the normalized weighted sums of variances and the normalized weighted sum of covariances corresponding to the first plurality of vectors of counts and the second plurality of vectors of counts.

3. The apparatus of claim 2, wherein the instructions are to cause the programmable circuitry to determine the normalized weighted sums of variances and the normalized weighted sum of covariances by:

generating a plurality of first variances based on the first plurality of vectors of counts;

generating a plurality of second variances based on the second plurality of vectors of counts; and generating a plurality of covariances based on the first plurality of vectors of counts and the second plurality of vectors of counts.

4. The apparatus of claim 3, wherein the instructions are to cause the programmable circuitry to determine the normalized weighted sums of variances and the normalized weighted sum of covariances by:

generating a first weighted sum of variances based on the plurality of first variances, the first weighted sum of variances corresponding to a first normalized weighted sum of variances of the first plurality of vectors of counts;

generating a second weighted sum of variances based on the plurality of second variances, the second weighted sum of variances corresponding to a second normalized weighted sum of variances of the second plurality of vectors of counts; and generating a weighted sum of covariances based on the plurality of covariances, the weighted sum of covariances corresponding to the normalized weighted sum of covariances of the first plurality of vectors of counts and the second plurality of vectors of counts.

5. The apparatus of claim 4, wherein the instructions are to cause the programmable circuitry to generate the first weighted sum of variances, the second weighted sum of variances, and the weighted sum of covariances based on a probability factor corresponding to lengths of the first plurality of vectors of counts and the second plurality of vectors of counts.

6. The apparatus of claim 1, wherein the instructions are to cause the programmable circuitry to zero-mean data in at least one of the first plurality of vectors of counts or the second plurality of vectors of counts before the programmable circuitry is to determine the coefficient values.

7. The apparatus of claim 1, wherein the instructions are to cause the programmable circuitry to select equations to be used by the programmable circuitry in response to obtaining a noise term from at least one of the first database proprietor or the second database proprietor.

8. A method to determine an audience size for media based on sketch data, the method comprising:

obtaining (a) first sketch data included in a first network communication from a first server of a first database proprietor and (b) second sketch data included in a second network communication from a second server of a second database proprietor, the first sketch data to represent a first audience of a media item including first subscribers of the first database proprietor, the second sketch data to represent a second audience of the media item including second subscribers of the second database proprietor, the first sketch data including a first plurality of vectors of counts, each vector of counts of the first plurality of vectors of counts representing the first audience as a distribution of first hash values, the first hash values corresponding to the first subscribers and generated using a hash algorithm, each vector of counts of the first plurality of vectors of counts including a plurality of bins having respective bin numbers, the first hash values usable to determine bin numbers for assigning the first subscribers to respective bins of the plurality of bins, the second sketch data including a second plurality of vectors of counts, each vector of counts of the second plurality of vectors of counts representing the second audience as a distribution of second hash values, the second hash values corresponding to the second subscribers and generated using the hash algorithm, each vector of counts of the second plurality of vectors of counts including the plurality of bins, the second hash values usable to determine bin numbers for assigning the second subscribers to respective bins of the plurality of bins, the first and second sketch data to preserve privacy of the first and second subscribers by representing the first and second subscribers via the first and second pluralities of vectors of counts instead of sharing identifying information associated with the first and second subscribers, wherein the first audience is known to the first database proprietor but not to the second database proprietor, and wherein the second audience is known to the second database proprietor but not to the first database proprietor;

determining coefficient values for a polynomial based on (a) normalized weighted sums of variances, (b) a normalized weighted sum of covariances, and (c) cardinalities, the normalized weighted sums of variances, the normalized weighted sum of covariances, and the cardinalities corresponding to the first plurality of vectors of counts and the second plurality of vectors of counts;

determining a real root value of the polynomial, the real root value indicative of a number of audience members of the first audience represented in the first plurality of vectors of counts that are also represented in the second plurality of vectors of counts;

determining the audience size based on the real root value and the cardinalities of the first plurality of vectors of counts and the second plurality of vectors of counts; and causing transmission of the audience size to a customer computer.

9. The method of claim 8, further including determining the normalized weighted sums of variances and the normalized weighted sum of covariances corresponding to the first plurality of vectors of counts and the second plurality of vectors of counts.

10. The method of claim 9, wherein the determining of the normalized weighted sums of variances and the normalized weighted sum of covariances includes:

generating a plurality of first variances based on the first plurality of vectors of counts;

generating a plurality of second variances based on the second plurality of vectors of counts; and generating a plurality of covariances based on the first plurality of vectors of counts and the second plurality of vectors of counts.

11. The method of claim 10, wherein the determining of the normalized weighted sums of variances and the normalized weighted sum of covariances includes:

generating a first weighted sum of variances based on the plurality of first variances, the first weighted sum of variances corresponding to a first normalized weighted sum of variances of the first plurality of vectors of counts;

generating a second weighted sum of variances based on the plurality of second variances, the second weighted sum of variances corresponding to a second normalized weighted sum of variances of the second plurality of vectors of counts; and generating a weighted sum of covariances based on the plurality of covariances, the weighted sum of covariances corresponding to the normalized weighted sum of covariances of the first plurality of vectors of counts and the second plurality of vectors of counts.

12. The method of claim 11, wherein the generating of the first weighted sum of variances, the second weighted sum of variances, and the weighted sum of covariances is based on a probability factor corresponding to lengths of the first plurality of vectors of counts and the second plurality of vectors of counts.

13. The method of claim 8, further including zero-meaning data in at least one of the first plurality of vectors of counts or the second plurality of vectors of counts before determining the coefficient values.

14. The method of claim 8, further including selecting equations to be used in response to obtaining a noise term from at least one of the first database proprietor or the second database proprietor.

15. A non-transitory computer readable storage medium comprising instructions that, when executed, cause at least one processor to determine an audience size for media based on sketch data, the processor to at least:

obtain (a) first sketch data included in a first network communication from a first server of a first database proprietor and (b) second sketch data included in a second network communication from a second server of a second database proprietor, the first sketch data to represent a first audience of a media item including first subscribers of the first database proprietor, the second sketch data to represent a second audience of the media item including second subscribers of the second database proprietor, the first sketch data including a first plurality of vectors of counts, each vector of counts of the first plurality of vectors of counts representing the first audience as a distribution of first hash values, the first hash values corresponding to the first subscribers and generated using a hash algorithm, each vector of counts of the first plurality of vectors of counts including a plurality of bins having respective bin numbers, the first hash values usable to determine bin numbers for assigning the first subscribers to respective bins of the plurality of bins, the second sketch data including a second plurality of vectors of counts, each vector of counts of the second plurality of vectors of counts representing the second audience as a distribution of second hash values, the second hash values corresponding to the second subscribers and generated using the hash algorithm, each vector of counts of the second plurality of vectors of counts including the plurality of bins, the second hash values usable to determine bin numbers for assigning the second subscribers to respective bins of the plurality of bins, the first and second sketch data to preserve privacy of the first and second subscribers by representing the first and second subscribers via the first and second pluralities of vectors of counts instead of sharing identifying information associated with the first and second subscribers, wherein the first audience is known to the first database proprietor but not to the second database proprietor, and wherein the second audience is known to the second database proprietor but not to the first database proprietor;

determine coefficient values for a polynomial based on (a) normalized weighted sums of variances, (b) a normalized weighted sum of covariances, and (c) cardinalities, the normalized weighted sums of variances, the normalized weighted sum of covariances, and the cardinalities corresponding to the first plurality of vectors of counts and the second plurality of vectors of counts;

determine a real root value of the polynomial, the real root value indicative of a number of audience members of the first audience represented in the first plurality of vectors of counts that are also represented in the second plurality of vectors of counts;

determine the audience size based on the real root value and the cardinalities of the first plurality of vectors of counts and the second plurality of vectors of counts; and cause transmission of the audience size to a customer computer.

16. The non-transitory computer readable storage medium of claim 15, wherein the instructions, when executed, cause the processor to determine the normalized weighted sums of variances and the normalized weighted sum of covariances corresponding to the first plurality of vectors of counts and the second plurality of vectors of counts.

17. The non-transitory computer readable storage medium of claim 16, wherein the instructions, when executed, cause the processor to determine the normalized weighted sums of variances and the normalized weighted sum of covariances by:
  generating a plurality of first variances based on the first plurality of vectors of counts;
  generating a plurality of second variances based on the second plurality of vectors of counts; and
  generating a plurality of covariances based on the first plurality of vectors of counts and the second plurality of vectors of counts.

18. The non-transitory computer readable storage medium of claim 17, wherein the instructions, when executed, cause the processor to determine the normalized weighted sums of variances and the normalized weighted sum of covariances by:
  generating a first weighted sum of variances based on the plurality of first variances, the first weighted sum of variances corresponding to a first normalized weighted sum of variances of the first plurality of vectors of counts;
  generating a second weighted sum of variances based on the plurality of second variances, the second weighted sum of variances corresponding to a second normalized weighted sum of variances of the second plurality of vectors of counts; and
  generating a weighted sum of covariances based on the plurality of covariances, the weighted sum of covariances corresponding to the normalized weighted sum of covariances of the first plurality of vectors of counts and the second plurality of vectors of counts.

19. The non-transitory computer readable storage medium of claim 18, wherein the instructions, when executed, cause the processor to generate the first weighted sum of variances, the second weighted sum of variances, and the weighted sum of covariances based on a probability factor corresponding to lengths of the first plurality of vectors of counts and the second plurality of vectors of counts.

20. The non-transitory computer readable storage medium of claim 15, wherein the instructions, when executed, cause the processor to zero-mean data in at least one of the first plurality of vectors of counts or the second plurality of vectors of counts before determining the coefficient values.

21. The non-transitory computer readable storage medium of claim 15, wherein the instructions, when executed, cause the processor to select equations to be used in response to obtaining a noise term from at least one of the first database proprietor or the second database proprietor.

22. An apparatus to determine an audience size for media based on sketch data, the apparatus comprising:
  means for obtaining (a) first sketch data included in a first network communication from a first server of a first database proprietor and (b) second sketch data included in a second network communication from a second server of a second database proprietor, the first sketch data to represent a first audience of a media item including first subscribers of the first database proprietor, the second sketch data to represent a second audience of the media item including second subscribers of the second database proprietor, the first sketch data including a first plurality of vectors of counts, each vector of counts of the first plurality of vectors of counts representing the first audience as a distribution of first hash values, the first hash values corresponding to the first subscribers and generated using a hash algorithm, each vector of counts of the first plurality of vectors of counts including a plurality of bins having respective bin numbers, the first hash values usable to determine bin numbers for assigning the first subscribers to respective bins of the plurality of bins, the second sketch data including a second plurality of vectors of counts, each vector of counts of the second plurality of vectors of counts representing the second audience as a distribution of second hash values, the second hash values corresponding to the second subscribers and generated using the hash algorithm, each vector of counts of the second plurality of vectors of counts including the plurality of bins, the second hash values usable to determine bin numbers for assigning the second subscribers to respective bins of the plurality of bins, the first and second sketch data to preserve privacy of the first and second subscribers by representing the first and second subscribers via the first and second pluralities of vectors of counts instead of sharing identifying information associated with the first and second subscribers, wherein the first audience is known to the first database proprietor but not to the second database proprietor, and wherein the second audience is known to the second database proprietor but not to the first database proprietor;
  means for determining coefficient values for a polynomial based on (a) normalized weighted sums of variances, (b) a normalized weighted sum of covariances, and (c) cardinalities, the normalized weighted sums of variances, the normalized weighted sum of covariances, and the cardinalities corresponding to the first plurality of vectors of counts and the second plurality of vectors of counts;
  means for determining a real root value of the polynomial, the real root value indicative of a number of audience members of the first audience represented in the first plurality of vectors of counts that are also represented in the second plurality of vectors of counts;

means for determining the audience size based on the real root value and the cardinalities of the first plurality of vectors of counts and the second plurality of vectors of counts; and means for transmitting the audience size to a customer computer.

23. The apparatus of claim 22, further including means for determining the normalized weighted sums of variances and the normalized weighted sum of covariances corresponding to the first plurality of vectors of counts and the second plurality of vectors of counts.

24. The apparatus of claim 23, wherein the means for determining the normalized weighted sums of variances and the normalized weighted sum of covariances is to determine the normalized weighted sums of variances and the normalized weighted sum of covariances by:

generating a plurality of first variances based on the first plurality of vectors of counts;

generating a plurality of second variances based on the second plurality of vectors of counts; and generating a plurality of covariances based on the first plurality of vectors of counts and the second plurality of vectors of counts.

25. The apparatus of claim 24, wherein the means for determining the normalized weighted sums of variances and the normalized weighted sum of covariances is to determine the normalized weighted sums of variances and the normalized weighted sum of covariances by:

generating a first weighted sum of variances based on the plurality of first variances, the first weighted sum of variances corresponding to a first normalized weighted sum of variances of the first plurality of vectors of counts;

generating a second weighted sum of variances based on the plurality of second variances, the second weighted sum of variances corresponding to a second normalized weighted sum of variances of the second plurality of vectors of counts; and generating a weighted sum of covariances based on the plurality of covariances, the weighted sum of covariances corresponding to the normalized weighted sum of covariances of the first plurality of vectors of counts and the second plurality of vectors of counts.

26. The apparatus of claim 25, wherein the means for determining the normalized weighted sums of variances and the normalized weighted sum of covariances is to generate the first weighted sum of variances, the second weighted sum of variances, and the weighted sum of covariances based on a probability factor corresponding to lengths of the first plurality of vectors of counts and the second plurality of vectors of counts.

27. The apparatus of claim 22, further including means for zero-meaning data in at least one of the first plurality of vectors of counts or the second plurality of vectors of counts before the means for determining the coefficient values is to determine the coefficient values.

28. The apparatus of claim 22, further including means for selecting equations to be used by the means for determining the coefficient values in response to obtaining a noise term from at least one of the first database proprietor or the second database proprietor.

* * * * *